US012418875B2

(12) United States Patent
Song et al.

(10) Patent No.: US 12,418,875 B2
(45) Date of Patent: Sep. 16, 2025

(54) ELECTRONIC DEVICE FOR MANAGING PDU SESSION AND OPERATING METHOD THEREOF

(71) Applicant: Samsung Electronics Co., Ltd., Suwon-si (KR)

(72) Inventors: Injae Song, Suwon-si (KR); Dongho Kim, Suwon-si (KR); Soomin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 17/667,107

(22) Filed: Feb. 8, 2022

(65) Prior Publication Data

US 2022/0272652 A1 Aug. 25, 2022

Related U.S. Application Data

(63) Continuation of application No. PCT/KR2022/000522, filed on Jan. 12, 2022.

(30) Foreign Application Priority Data

Feb. 18, 2021 (KR) .................. 10-2021-0021895

(51) Int. Cl.
*H04W 76/10* (2018.01)
*H04W 60/04* (2009.01)
*H04W 92/02* (2009.01)

(52) U.S. Cl.
CPC .......... *H04W 60/04* (2013.01); *H04W 76/10* (2018.02); *H04W 92/02* (2013.01)

(58) Field of Classification Search
CPC ..... H04W 60/04; H04W 76/10; H04W 92/02; H04W 88/06
See application file for complete search history.

(56) References Cited

U.S. PATENT DOCUMENTS

2014/0293961 A1* 10/2014 Khay-Lbbat ............ H04L 49/15
370/331
2020/0128504 A1 4/2020 Babu et al.
(Continued)

FOREIGN PATENT DOCUMENTS

CN 112020096 A 12/2020
EP 03346762 A1 7/2018
(Continued)

OTHER PUBLICATIONS

Oppo (Returning back to NG-RAN in case of RAT/EPS fallback, S2-181884, Mar. 2018).*
(Continued)

*Primary Examiner* — Lakeram Jangbahadur
(74) *Attorney, Agent, or Firm* — Jefferson IP Law, LLP

(57) ABSTRACT

An electronic device is provided. The electronic device includes at least one processor, which may be configured to establish at least one first protocol data unit (PDU) session in a state of being registered in a 5th generation system (5GS), store first information related to the at least one first PDU session, perform a procedure for registering with an evolved packet system (EPS), based on at least one first trigger causing a system fallback from the 5GS to the EPS, perform a procedure for registering with the 5GS, based on at least one second trigger causing a return to the 5GS, compare second information related to a second PDU session, with the first information, perform an operation of establishing, a third PDU session when the third PDU session not comprised in the second PDU session is identified, and perform an operation of modifying, a fourth PDU session.

20 Claims, 16 Drawing Sheets

(56) References Cited

U.S. PATENT DOCUMENTS

| | | | |
|---|---|---|---|
| 2020/0195762 A1 | 6/2020 | Gan et al. | |
| 2020/0229059 A1 | 7/2020 | Xu et al. | |
| 2020/0336948 A1 | 10/2020 | Kawasaki et al. | |
| 2020/0336964 A1 | 10/2020 | Kawasaki et al. | |
| 2020/0413298 A1 | 12/2020 | Ke | |
| 2023/0319621 A1* | 10/2023 | Gan | H04L 65/1069 370/229 |
| 2023/0397072 A1* | 12/2023 | Prabhakar | H04L 69/322 |

FOREIGN PATENT DOCUMENTS

| | | | |
|---|---|---|---|
| EP | 03484205 A1 | 5/2019 | |
| EP | 03675557 A1 | 7/2020 | |
| JP | 2019-096953 A | 6/2019 | |
| JP | 2020-137084 A | 8/2020 | |
| KR | 101744224 B1 * | 4/2014 | ........ H04W 36/0022 |
| KR | 10-2020-0030555 A | 3/2020 | |
| WO | 2020/160177 A1 | 8/2020 | |

OTHER PUBLICATIONS

3GPP (3GPP TS 23 501 V16.7.0, System architecture for the 5G System (5GS), (Dec. 2020)).*
3GPP502 (3GPP TS 23.502 V16.7 1 (Jan. 2021), Procedures for the 5G System (5GS)).*
Oppo, Returning back to NG-RAN in case of RAT/EPS fallback, S2-181884, 3GPP TSG SA WG2 Meeting #126, Montreal, Canada, Feb. 20, 2018.
3GPP; TSG SA; System architecture for the 5G System (5GS); Stage 2 (Release 16), 3GPP TS 23.501 V16.7.0 (Dec. 2020), Dec. 17, 2020.
3GPP; TSG SA; Procedures for the 5G System (5GS); Stage 2 (Release 16), 3GPP TS 23.502 V16.7.1 (Jan. 2021), Jan. 13, 2021.
International Search Report and Written Opinion dated Apr. 21, 2022, issued in International Patent Application No. PCT/KR2022/000522.

* cited by examiner

ELECTRONIC DEVICE FOR MANAGING PDU SESSION AND OPERATING METHOD THEREOF

CROSS-REFERENCE TO RELATED APPLICATION(S)

This application is a continuation application, claiming priority under § 365(c), of an International application No. PCT/KR2022/000522, filed on Jan. 12, 2022, which is based on and claims the benefit of a Korean patent application number 10-2021-0021895, filed on Feb. 18, 2021, in the Korean Intellectual Property Office, the disclosure of which is incorporated by reference herein in its entirety.

BACKGROUND

1. Field

The disclosure relates to an electronic device for managing a protocol data unit (PDU) session and an operating method thereof. More particularly, the disclosure relates to an electronic device for performing PDU session establishment and/or modification and an operating method thereof.

2. Description of Related Art

To support various application scenarios based on an Internet protocol (IP) multimedia subsystem (IMS) voice service, a new radio (NR) connected to a user equipment (UE) and a 5th generation core (5GC) network may support a radio access technology (RAT) fallback or an evolved packet system (EPS) fallback (evolved-universal terrestrial radio access network (E-UTRAN) connected to EPC system fallback). For example, the UE connected to the NR connected to the 5GC may be handed over (or directed or redirected) to an evolved universal mobile telecommunications system (UMTS) terrestrial radio access (E-UTRA) connected to the 5GC, which may be referred to as a RAT fallback. Alternatively, the UE connected to the NR connected to the 5GC may be handed over or redirected to an EPS (e.g., an E-UTRA connected to an evolved packet core (EPC)), which may be referred to as a system fallback.

A serving access and mobility function (AMF) for the UE may notify the UE that an IMS voice through a PS session is supported during a registration procedure of the UE. When a request for establishment of a quality of service (QOS) flow for an IMS voice reaches a next-generation radio access network (NG-RAN), the NG-RAN responds to report the rejection of the request for the establishment and may trigger one of the following procedures, based on UE capability, N26 possibility, a network configuration, and a radio condition.

- Redirection to EPS
- Handover to EPS
- Redirection to E-UTRA connected to 5GC
- Handover to E-UTRA connected to 5GC Based on the above description, the UE may access the EPS and/or E-UTRA to perform an IMS service. Alternatively, the UE may perform a fallback in order to perform an emergency service in addition to the IMS service. After the fallback, the UE may return to the NR connected to the 5GC.

The above information is presented as background information only to assist with an understanding of the disclosure. No determination has been made, and no assertion is made, as to whether any of the above might be applicable as prior art with regard to the disclosure.

SUMMARY

As described above, when a service (e.g., an Internet protocol (IP) multimedia subsystem (IMS) voice service or an emergency service) in a fallback system is completed after a fallback is performed, a user equipment (UE) may return to new radio (NR) corrected to a 5th generation core (5GC) network. The UE may perform the system fallback in a state of establishing at least one protocol data unit (PDU) session based on 5th generation (5G) communication before the fallback. In this case, at least some PDU sessions may be converted into a packet data network (PDN) connection. In addition, when the UE returns to a 5G system (5GS) from a fallback evolved packet system (EPS), at least some PDN connections may be converted into a PDU session. However, at least some of the PDU sessions before the fallback are likely to be lost, or at least some of the PDU sessions are likely to have a change in characteristic. Accordingly, when performing the fallback and then returning to the 5GS, the UE is likely to be unable to use at least some of the PDU sessions established before the fallback.

Aspects of the disclosure are to address at least the above-mentioned problems and/or disadvantages and to provide at least the advantages described below. Accordingly, an aspect of the disclosure is to provide an electronic device and an operating method capable of storing information related to a PDU session before a fallback, comparing the PDU session with a PDU session identified after returning to a $5^{th}$ generation system (5GS), and establishing and/or modifying the PDU session, based on a comparison result.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor, wherein the at least one processor may be configured to establish at least one first PDU session in a state of being registered in a 5GS, store first information related to the at least one first PDU session, perform a procedure for registering with an EPS, based on at least one first trigger causing a system fallback from the 5GS to the EPS, perform a procedure for registering with the 5GS, based on at least one second trigger causing a return to the 5GS, compare second information related to at least one second PDU session, established in association with registration with the 5GS, with the first information, perform an operation of establishing, based on a result of comparing the first information with the second information, at least one third PDU session when the at least one third PDU session not included in the at least one second PDU session among the at least one first PDU session is identified, and perform an operation of modifying, based on the result of comparing the first information and the second information, at least one fourth PDU session when the at least one fourth PDU session having a same identification information as the at least one second PDU session among the at least one first PDU session and having a characteristic different from a characteristic of the at least one second PDU session among the at least one first PDU session is identified.

In accordance with another aspect of the disclosure, an operating method of an electronic device is provided. The operating method includes establishing at least one first PDU session in a state of being registered in a 5GS, storing first information related to the at least one first PDU session, performing a procedure for registering with an EPS, based on at least one first trigger causing a system fallback from the 5GS to the EPS, performing a procedure for registering with the 5GS, based on at least one second trigger causing a return to the 5GS, comparing second information related to at least one second PDU session, established in association with registration with the 5GS, with the first information, performing an operation of establishing, based on a result of comparing the first information with the second information, at least one third PDU session when the at least one third PDU session not included in the at least one second PDU session among the at least one first PDU session is identified, and performing an operation of modifying, based on the result of comparing the first information and the second information, at least one fourth PDU session when the at least one fourth PDU session having a same identification information as the at least one second PDU session and having a characteristic different from a characteristic of the at least one second PDU session among the at least one first PDU session is identified.

According to various embodiments, it is possible to provide an electronic device and an operating method thereof which are capable of storing information related to a PDU session before a fallback, comparing the PDU session with a PDU session identified after returning to a 5GS, and establishing and/or modifying the PDU session, based on a comparison result. Accordingly, the electronic device may equally use at least one PDU session, which is used in the 5GS before the fallback, after the fallback and then the return.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
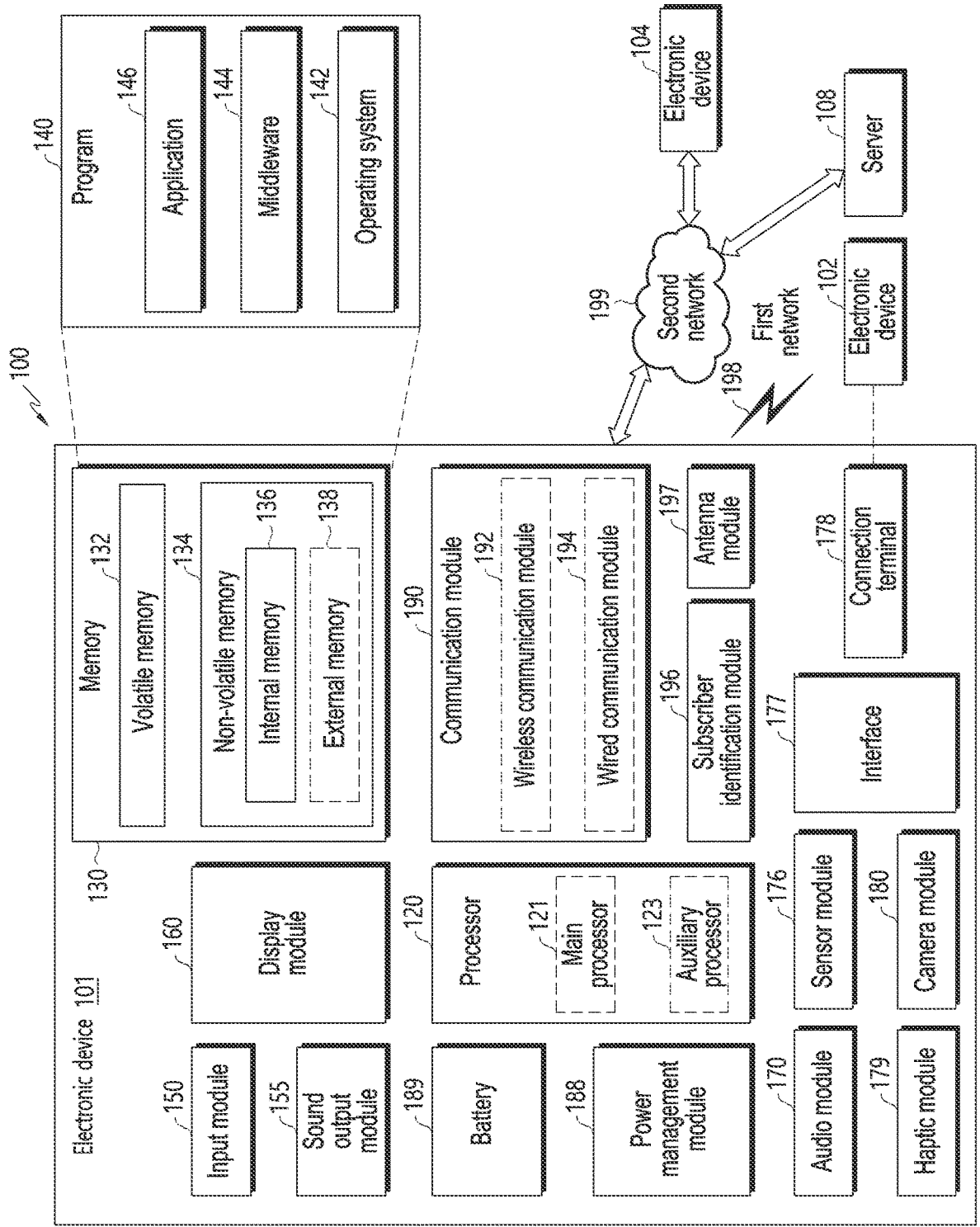
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
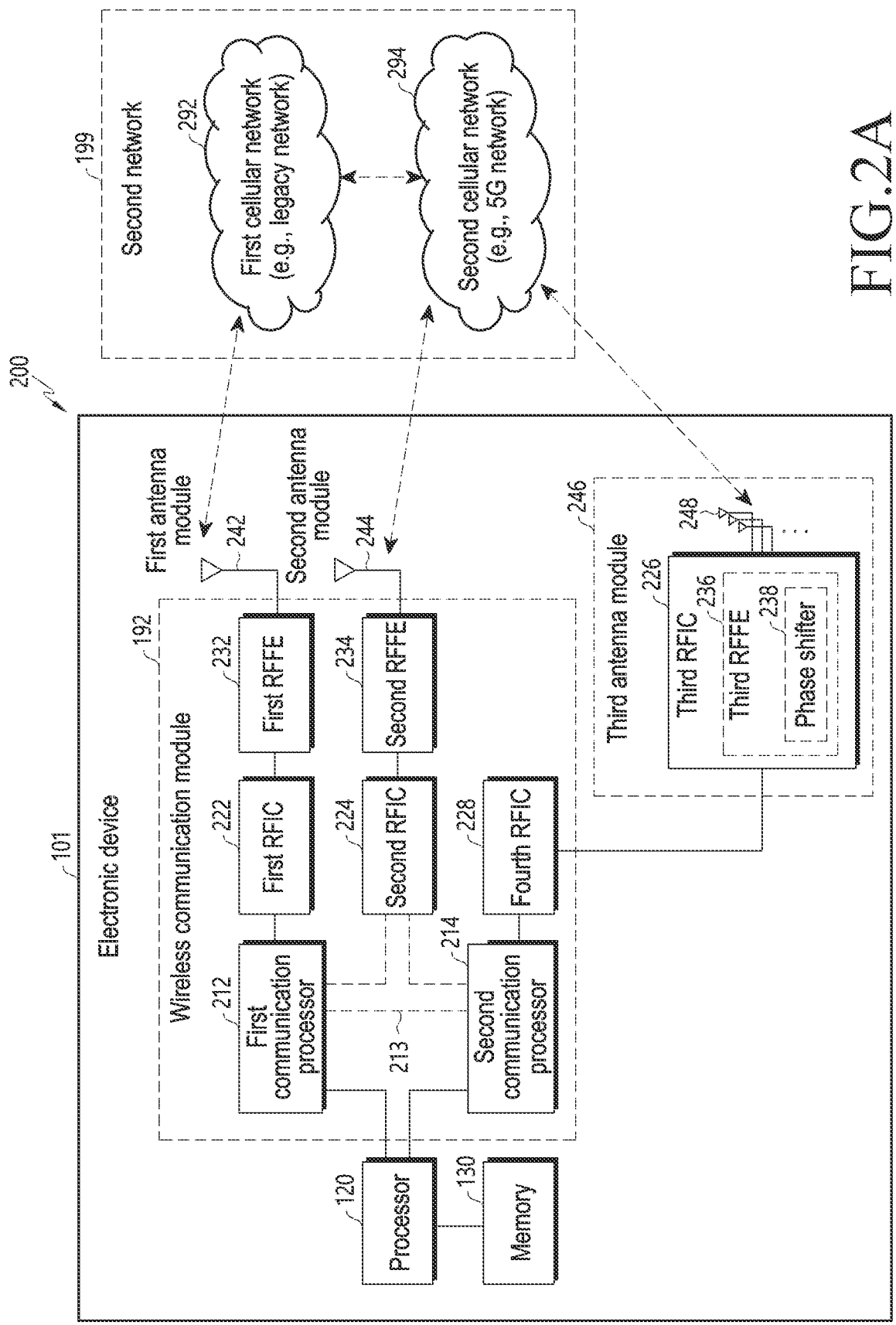
FIGS. 2A and 2B are block diagrams illustrating an electronic device for supporting communication via a legacy network and communication via a 5th generation (5G) network according to various embodiments of the disclosure.
Figure 2B:
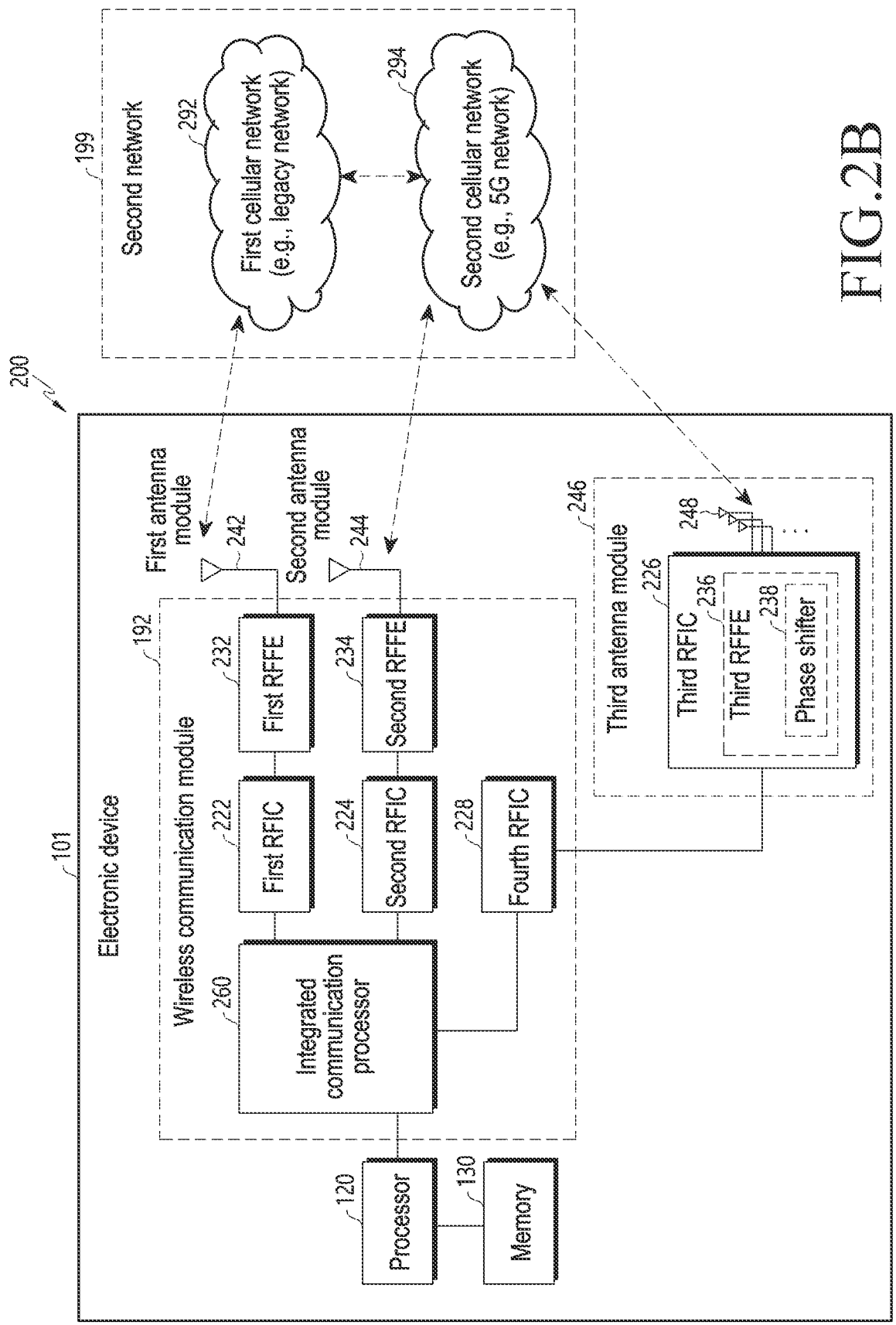

FIGS. 2A and 2B are block diagrams illustrating an electronic device for supporting communication via a legacy network and communication via a 5G network according to various embodiments of the disclosure.

Referring to FIG. 2A depicting block diagram 200, an electronic device 101 may include a first communication processor 212, a second communication processor 214, a first radio-frequency integrated circuit (RFIC) 222, a second RFIC 224, a third RFIC 226, a fourth RFIC 228, a first radio-frequency front end (RFFE) 232, a second RFFE 234, a first antenna module 242, a second antenna module 244, a third antenna module 246, and antennas 248. The electronic device 101 may further include a processor 120 and a memory 130. A second network 199 may include a first cellular network 292 and a second cellular network 294. According to another embodiment, the electronic device 101 may further include at least one of the components illustrated in FIG. 1, and the second network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least part of a wireless communication module 192. According to another embodiment, the fourth RFIC 228 may be omitted or may be included as part of the third RFIC 226.

The first communication processor 212 may establish a communication channel in a band to be used for wireless communication with the first cellular network 292 and may support communication via a legacy network through the established communication channel. According to various embodiments, the first cellular network may be a legacy network including a second-generation (2G), third-generation (3G), fourth generation (4G), or long-term evolution (LTE) network. The second communication processor 214 may establish a communication channel corresponding to a specified band (e.g., about 6 GHz to about 60 GHz) in a band to be used for wireless communication with the second cellular network 294 and may support communication via a 5G network through the established communication channel. According to various embodiments, the second cellular network 294 may be a 5G network defined by the 3GPP. In addition, according to an embodiment, the first communication processor 212 or the second communication processor 214 may establish a communication channel corresponding to a different specified band (e.g., about 6 GHz or lower) in the band to be used for wireless communication with the second cellular network 294 and may support communication via a 5G network through the established communication channel.

The first communication processor 212 may transmit and receive data to and from the second communication processor 214. For example, data classified to be transmitted through the second cellular network 294 may be changed to be transmitted through the first cellular network 292. In this case, the first communication processor 212 may receive the data to be transmitted from the second communication processor 214. For example, the first communication processor 212 may transmit and receive data to and from the second communication processor 214 through an inter-processor interface 213. The inter-processor interface 213 may be configured, for example, as a universal asynchronous receiver/transmitter (UART, e.g., high-speed UART (HS-UART)) or peripheral component interconnect express (PCIe) bus interface but is not limited in type. Alternatively, the first communication processor 212 and the second communication processor 214 may exchange control information and packet data information, for example, using a shared memory. The first communication processor 212 may transmit and receive various types of information, such as sensing information, output strength information, and resource block (RB) allocation information, to and from the second communication processor 214.

The first communication processor 212 may not be directly connected to the second communication processor 214 depending on a configuration. In this case, the first communication processor 212 may transmit and receive data to and from the second communication processor 214 via a processor 120 (e.g., an application processor). For example, the first communication processor 212 and the second communication processor 214 may transmit and receive data to and from each other through the processor 120 (e.g., the application processor) and an HS-UART interface or a PCIe interface, but the type of an interface is not limited. Alternatively, the first communication processor 212 and the second communication processor 214 may exchange control information and packet data information using the processor 120 (e.g., the application processor) and a shared memory.

According to an embodiment, the first communication processor 212 and the second communication processor 214 may be configured in a single chip or a single package. According to various embodiments, the first communication processor 212 or the second communication processor 214 may be configured along with the processor 120, an auxiliary processor 123, or a communication module 190 in a single chip or a single package. For example, referring to FIG. 2B depicting a block diagram 200, an integrated communication processor 260 may support functions for communication with both the first cellular network 292 and the second cellular network 294.

In transmission, the first RFIC 222 may convert a baseband signal generated by the first communication processor 212 into a radio-frequency (RF) signal of about 700 MHz to about 3 GHz used for the first cellular network 292 (e.g., a legacy network). In reception, an RF signal may be obtained from the first cellular network 292 (e.g., the legacy network) through an antenna (e.g., the first antenna module 242) and may be preprocessed by an RFFE (e.g., the first RFFE 232).

The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, "5G sub-6 RF signal") in a sub-6 band (e.g., about 6 GHz or lower) used for the second cellular network 294 (e.g., a 5G network). In reception, a 5G sub-6 RF signal may be obtained from the second cellular network 294 (e.g., the 5G network) through an antenna (e.g., the second antenna module 244) and may be preprocessed by an RFFE (e.g., the second RFFE 234). The second RFIC 224 may convert the preprocessed 5G sub-6 RF signal into a baseband signal to be processed by a corresponding communication processor of the first communication processor 212 or the second communication processor 214.

The third RFIC 226 may convert a baseband signal generated by the second communication processor 214 into an RF signal (hereinafter, "5G above-6 RF signal") in a 5G above-6 band (e.g., about 6 GHz to about 60 GHz) used for the second cellular network 294 (e.g., the 5G network). In reception, a 5G above-6 RF signal may be obtained from the second cellular network 294 (e.g., the 5G network) through an antenna (e.g., an antenna 248) and may be preprocessed by the third RFFE 236. The third RFIC 226 may convert the preprocessed 5G above-6 RF signal into a baseband signal to be processed by the second communication processor 214. According to an embodiment, the third RFFE 236 may be configured as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 into an RF signal (hereinafter, "IF signal") in an intermediate frequency band (e.g., about 9 GHz to about 11 GHz) and may transmit the IF signal to the third RFIC 226. The third RFIC 226 may convert the IF signal into a 5G above-6 RF signal. In reception, a 5G above-6 RF signal may be received from the second cellular network 294 (e.g., the 5G network) through an antenna (e.g., the antenna 248) and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be configured as at least part of a single chip or a single package. According to various embodiments, in FIG. 2A or FIG. 2B, when the first RFIC 222 and the second RFIC 224 are configured as a single chip or a single package, the first RFIC 222 and the second RFIC 224 may be configured as an integrated RFIC. In this case, the integrated RFIC may be connected to the first RFFE 232 and the second RFFE 234, thus converting a baseband signal into a signal in a band supported by the first RFFE 232 and/or the second RFFE 234, and transmitting the converted signal to one of the first RFFE 232 and the second RFFE 234. According to an embodiment, the first RFFE 232 and the second RFFE 234 may be configured as at least part of a single chip or a single package. According to an embodiment, at least one of the first antenna module 242 or the second antenna module 244 may be omitted or may be combined with a different antenna module to process corresponding RF signals in a plurality of bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a portion (e.g., a lower surface) of a second substrate (e.g., a sub-PCB) separate from the first substrate, and the antenna 248 may be disposed in another portion (e.g., an upper surface), thereby forming the third antenna module 246. The third RFIC 226 and the antenna 248 may be disposed on the same substrate, thereby reducing the length of a transmission line therebetween, which may reduce loss (e.g., attenuation) of, for example, a signal in a high-frequency band (e.g., about 6 GHz to about 60 GHz) used for communication via a 5G network due to the transmission line. Accordingly, the electronic device 101 may improve the quality or speed of communication with the second cellular network 294 (e.g., the 5G network).

According to an embodiment, the antenna 248 may be configured as an antenna array including a plurality of antenna elements which can be used for beamforming. In this case, the third RFIC 226 may include, for example, a plurality of phase shifters 238 corresponding to the plurality of antenna elements as part of the third RFFE 236. In transmission, each of the plurality of phase shifters 238 may convert the phase of a 5G above-6 RF signal to be transmitted to an external device (e.g., a base station of the 5G network) of the electronic device 101 through a corresponding antenna element. In reception, each of the plurality of phase shifters 238 may convert the phase of a 5G above-6 RF signal received from the outside through a corresponding antenna element into the same phase or substantially the same phase. This enables transmission or reception through beamforming between the electronic device 101 and the outside.

The second cellular network 294 (e.g., the 5G network) may operate independently of the first cellular network 292 (e.g., the legacy network) (e.g., stand-alone (SA) mode) or may be connected to operate (e.g., non-stand-alone (NSA) mode). For example, the 5G network may have only an access network (e.g., a 5G radio access network (RAN) or a next-generation RAN (NG RAN)) and may not have a core network (e.g., a next-generation core (NGC)). In this case, after accessing the access network of the 5G network, the electronic device 101 may access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in a memory 230 and may be accessed by a different component (e.g., the processor 120, the first communication processor 212, or the second communication processor 214).

Figure 3:
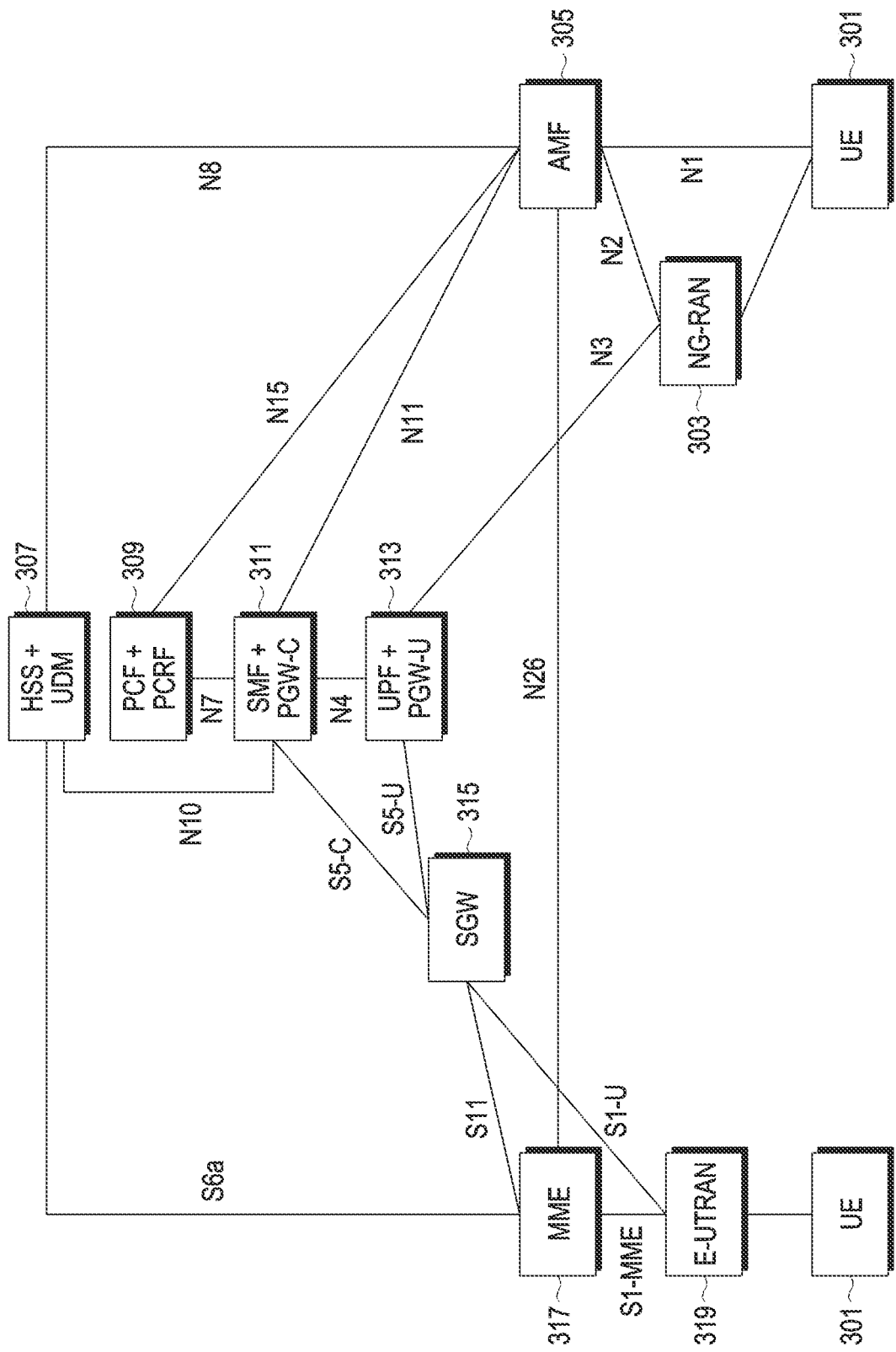
FIG. 3 illustrates the structure of a wireless communication system supporting interworking according to an embodiment of the disclosure.

FIG. 3 illustrates the structure of a wireless communication system supporting interworking between networks according to an embodiment of the disclosure.

According to various embodiments of the disclosure, a standard specification (e.g., Technical Specification (TS) 23.501, TS 23.502, and TS 23.503) defined by the International Telecommunication Union (ITU) or the 3rd Generation Partnership Project (3GPP) may be referred to for a network technology. Each component included in the network structure of FIG. 3 may refer to a physical entity or may refer to software for performing an individual function or hardware combined with the software. Referring to FIG. 3, reference symbols expressed as Nx, such as N1, N2, N3, and the like, indicate known interfaces between network functions (NFs) in a 5G core network (CN), and a standard specification (TS 23.501) may be referred to for a relevant description, thus obviating the need for a detailed description. In the following description of FIG. 3, NFs not directly related to various embodiments of the disclosure will not be illustrated/described.

FIG. 3 illustrates an example of the structure of interworking between a 5GS and an EPS in a non-roaming situation. The 5GS may include a new radio (NR) base station (NG-radio access node (RAN) or next-generation node B (gNB)) 303 for radio access of a UE 301 (e.g., the electronic device 101), an access and mobility management function (AMF) 305, a session management function (SMF), a user plane function (UPF), a policy control function (PCF), a network slicing selection function (NSSF), a unified data management (UDM), a unified data repository (UDR), and the like. The EPS may include an E-UTRA base station (evolved universal mobile telecommunications system (UMTS) terrestrial radio access network (E-UTRAN) 319 or evolved node B (eNB)), a mobility management entity (MME) 317, a serving gateway (SGW) 315, a packet data network gateway (PGW, including a PGW-U and a PGW-C), a policy and charging rule function (PCRF), and a home subscriber server (HSS).

According to an embodiment, the AMF 305 and the MME 317 are network functions (NFs) that manage radio network access and mobility for the UE. The SMF, the SGW, and the PGW are NFs that manage a session for the UE, and session information includes quality-of-service (QOS) information, charging information, and information for packet processing. The UPF and the PGW are NFs that process user plane traffic (e.g., User Plane traffic), and are controlled by the SMF and the SGW. The PCF and the PCRF are NFs that manage an operator policy and/or a public land mobile network (PLMN) policy for providing a service in a wireless communication system. In addition, the PCF may be divided into a PCF in charge of an access and mobility (AM) policy and a UE policy and a PCF in charge of a session management (SM) policy. The PCF in charge of the AM/UE policy and the PCF in charge of the SM policy may be logically or physically separate NFs or may be logically or physically one NF. The UDM and the HSS are NFs that store and manage subscriber information (UE subscription) about the UE. The UDR is an NF or database (DB) that stores and manages data. The UDR may store subscription information about the UE and may provide the subscription information about the UE to the UDM. Further, the UDR may store operator policy information and may provide the operator policy information to the PCF. The NSSF may be an NF that performs a function of selecting a network slice instance serving the UE or determining network slice selection assistance information (NSSAI).

An instance may refer to a state in which an NF exists as a code of software and can implement a function of the NF by being allocated a physical or/and logical resource from a computing system in order to perform the function of the NF in the physical computing system (e.g., a specific computing system existing in a core network). For example, an AMF instance, an SMF instance, and an NSSF instance may refer to states in which physical and/or logical resources for AMF, SMF, and NSSF operations are respectively allocated from the specific computing system existing in the core network and can be used. Therefore, in a case where physical AMF, SMF, and NSSF devices exist and in an AMF instance, an SMF instance, and an NSSF instance in which physical and/or logical resources for AMF, SMF, and NSSF operations are allocated from a specific computing system existing in a network and are used, the same operation may be performed.

The UDM of the 5GS and the HSS of the EPS may be configured as one combo node (referred to as UDM+HSS node) 307. The UDM+HSS node 307 may store the subscriber information about the UE. The SMF of the 5GS and the PGW-C of the EPS may be configured as one combo node (referred to as SMF+PGW-C node) 311. The PCF of the 5GS and the PCRF of the EPS may be configured as one combo node (referred to as PCF+PCRF) 309. The UPF of the 5GS and the PGW-U of the EPS may be configured as one combo node (referred to as UPF+PGW-C) 313. The UE 301 may access the MME 317 of the EPS through the E-UTRAN 319 (e.g., a base station) and may use an EPS network service. In addition, the UE may access the AMF 305 of the 5GS through the NR base station and may use a 5GS network service.

As described, one NF or network entity may support different network systems at the same time, and this NF, network node or network entity may be referred to as the foregoing combo node, a combo NF, a combined node, a combined NF, an interworking node, or an interworking NF. A function of an NF illustrated as a combo node may be implemented through interworking between two or more network entities. In addition, for convenience of illustration and description, an NF simultaneously supporting different network systems may be indicated using a sign "+" or a sine "/". For example, when the SMF and the PGW-C are configured as one combo node, the combo node may be referred as a PGW-C/SMF, a PGW-C+SMF, an SMF/PGW-C, or an SMF+PGW-C.

The UE establishes a session by accessing a data network (e.g., a network providing an Internet service) through the 5GS or the EPS and may distinguish each data network using an identifier, such as a data network name (DNN) or an access point name (APN). To distinguish a data network, the 5GS may use a data network name (DNN), and the EPS may use an access point name (APN). The DNN and the APN may be used to determine at least one of an NF related to a user plane, an interface between NFs, and an operator policy when the UE establish a session with a network system. The DNN and the APN may be understood as equivalent information and may transmit the same information. The DNN may be used, for example, to select the SMF and the UPF(s) for a PDU session, and may be used to select an interface (e.g., an N6 interface(s)) between the data network and the UPF for the PDU session. In addition, the DNN may be used to determine a policy of a mobile network operator to be applied to the PDU session.

In the 5GS, the UE may be connected to one data network through at least one network slice. When the UE establishes a PDU session for a certain data network in the 5GS and then moves to the EPS, a PDN connection may be established with the data network of the SMF+PGW-C node 311.

A service-based interface related to the SMF is defined as 'Nsmf' in 3GPP TS 23.502, for example, as shown in Table 1.

TABLE 1

Table 5.2.8.1-1:NF services provided by thr SMF

| Service Name | Service Operations | Operation Semantics | Example Consumer(s) |
| --- | --- | --- | --- |
| Nsmf_PDUSession | Create | Request/Response | V-SMF/I-SMF |
| | Update | Request/Response | V-SMF/I-SMF, H-SMF |
| | Release | Request/Response | V-SMF/I-SMF |
| | CreateSMContext | Request/Response | AMF |
| | UpdateSMContext | Request/Response | AMF |
| | ReleaseSMContext | Request/Response | AMF |
| | SMContextStatusNotify | Subscribe/Notify | AMF |
| | StatusNotify | Subscribe/Notify | V-SMF/I-SMF |
| | ContextRequest | Request/Response | AMF, I-SMF, SMF |
| | ContextPush | Request/Response | SMF |
| | SendMOData | Request/Response | AMF |
| | TransferMOData | Request/Response | V-SMF/I-SMF |
| | TransferMTData | Request/Response | SMF, H-SMF |

In Table 1, 'Nsmf_PDUSession' refers to a service operating in a PDU session, the service includes operations of establishing/deleting/modifying the PDU session, and these operations may be performed through transmission and reception of a PDU session request/response message between the AMF and the SMF. As illustrated in Table 1, in an association creation operation between the AMF and the SMF for supporting a PDU session, the SMF may receive a 'Nsmf_PDUSession_CreateSMContext' request message, which is a PDU session request message, from the AMF and may transmit a 'Nsmf_PDUSession_CreateSMContext' response message to the AMF in response. Related standards may be referred to for other service operations in Table 1, and a detailed description thereof will be omitted.

In the following embodiments, combo nodes, such as a UDM+HSS node, a PCF+PCRF node, a SMF+PGW-C node, and a UPF+PGW-C node, will be described with the term "node" omitted for convenience of description. Further, in the following embodiments, a definition of a message defined in one embodiment may be applied with the same meaning to other embodiments using the same message.

Figure 4A:
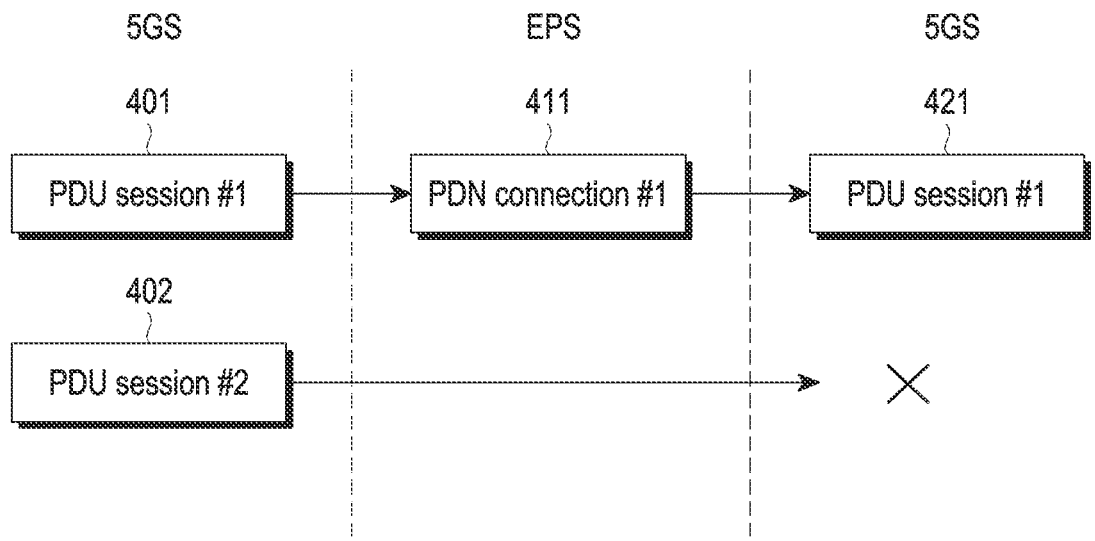
FIGS. 4A and 4B illustrate a protocol data unit (PDU) session and a packet data network (PDN) connection established in an electronic device according to various embodiments of the disclosure.
Figure 4B:
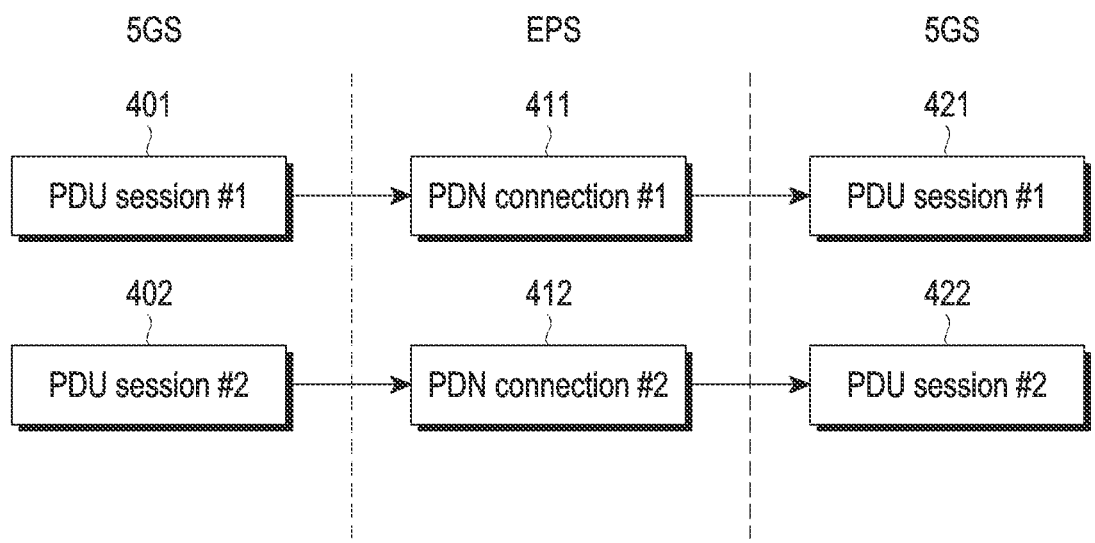

FIGS. 4A and 4B illustrate a PDU session and a PDN connection established in an electronic device according to various embodiments of the disclosure. At least some of operations of the electronic device 101 according to the comparative examples may also be performed by the electronic device 101 according to various embodiments.

The electronic device 101 (e.g., at least one of the processor 120 of FIG. 1, FIG. 2A, or FIG. 2B, the first communication processor 212 of FIG. 2A, the second communication processor 214 of FIG. 2A, or the integrated communication processor 260 of FIG. 2B) may establish at least one PDU session, for example, a first PDU session 401 and a second PDU session 402, for example, in a state of being registered in a 5GS. For example, the electronic device 101 may transmit a PDU session establishment request to a network. The network may establish a PDU session between the electronic device 101 and the network, based on the PDU session establishment request from the electronic device 101, and a PDU establishment process will be described with reference to FIG. 7A. Accordingly, in a state in which the first PDU session 401 and the second PDU session 402 are established, the electronic device 101 may perform data transmission and reception, based on the first PDU session 401 and/or the second PDU session 402. The first PDU session 401 and the second PDU session 402 may be identified by a PDU session ID (e.g., a PDU session identifier (PSI)) and/or a QoS flow identifier (QFI).

Although not shown, each of the first PDU session 401 and/or the second PDU session 402 may include at least one QoS flow and a QoS rule. The electronic device 101 may receive, for example, a QoS flow descriptor from the network, and the QOS flow description may include information related to the QoS flow (e.g., a QoS flow ID (QFI) and a QoS flow parameter list). For example, the QoS flow parameter list may include an EPS bearer identity (EBI). The EBI included in the QoS flow parameter list may be, for example, an identifier for identifying an EPS bearer mapped to the QoS flow, and may be referred to a mapped EBI. Information related to the EPS bearer mapped to the QoS flow may be referred to as a mapped EPS bearer context.

The electronic device 101 may perform a system fallback to an EPS (hereinafter, referred to as an EPS fallback) in a state being registered to the 5GS. For example, the electronic device 101 may perform an EPS fallback in order to perform a service that causes an EPS fallback (e.g., an IMS voice service or an emergency service). For example, the electronic device 101 may perform an EPS fallback upon receiving a command to hand over to an access network (AN) connected to the EPS from the network or an RRC release message for a redirection to the AN connected to the EPS. An EPS fallback procedure will be described with reference to FIG. 8A. After performing the handover or the redirection, based on the EPS fallback, the electronic device 101 may perform a tracking area update (TAU) procedure or an attach procedure to the EPS. The electronic device 101 may establish a PDN connection during the procedure. Alternatively, it may be expressed that the electronic device 101 converts the PDU session into a PDN connection, and this case is also expressed as establishing a PDN connection in various embodiments of the disclosure.

For example, referring to FIG. 4A, an electronic device 101 may establish a first PDN connection 411. The first PDN connection 411 may correspond to the first PDU session 401. The electronic device 101 may establish an EPS bearer, for example, based on the stored EPS bearer context.

The electronic device 101 establishes the first PDN connection 411 corresponding to the first PDU session 401 as illustrated in FIG. 4A, but may not establish a PDN connection corresponding to the second PDU session 402. For example, the electronic device 101 may convert the first PDU session 401 into the first PDN connection 411 by changing a characteristic of the first PDU session 401. For example, the first PDU session 401 may include a DNN of "IMS" and S-NSSAI of "A", and the second PDU session 402 may include a DNN of "Internet" and the S-NSSAI of "A". The electronic device 101 may change the DNN of the first PDU session 401 to an APN and may delete the S-NSSAI not supported in LTE, but there is no limitation on examples of a change. Information related to the PDU session used by the electronic device 101 in the 5GS may or may not be supported according to the EPS. For example, 3GPP TS 23.501 suggests that mobility from a 5th generation core (5GC) to an evolved packet core (EPC) does not grantee that all activated PDU session(s) can be transferred to the EPC. In addition, mobility from the EPC to the 5GC may also not guarantee that all activated PDU session(s) can be transferred to the 5GC. The S-NSSAI of the PDN connection mapped to the PDU session may be configured according to a policy of the network. For example, it may be guaranteed that the existing PDU session is equally configured. According to 3GPP TS 24.501, even though the N26 interface is configured, when there is no mapped session (or connection) even though an N26 interface is configured, local release may occur. For example, it is assumed that the second PDU session 402 includes the DNN of "IMS" and S-NSSAI of "B". In this case, the electronic device 101 does not establish PDN connections corresponding to the respective PDU sessions 401 and 402, based on the first PDN connection 411 having the APN of "IMS", and may transmit and receive data, based on the first PDN connection 411 having the APN of "IMS". Accordingly, there is a possibility that a PDN connection corresponding to the second PDU session 402 may not be established.

The electronic device 101 may move back to the 5GS after the EPS fallback. For example, the electronic device 101 may receive a command to hand over to the AN connected to the 5GC and may thus perform a procedure for a handover to the AN connected to the 5GC. The electronic device 101 may perform a procedure for registration with the 5GC, and the procedure for the registration will be described with reference to FIG. 9. The electronic device 101 may establish a first PDU session 421, based on the procedure for the registration with the 5GC or a PDU session establishment procedure after the registration with the 5GC. For example, the electronic device 101 may convert the first PDN connection 411 into the first PDU session 421 by changing a characteristic of the first PDN connection 411. The first PDU session 421 may have the same characteristic, for example, as the first PDU session 401 previously established. There is a possibility that the electronic device 101 may not establish a PDU session having the same characteristic as the second PDU session 402 previously established after returning to the 5GS. In this case, the electronic device 101 may not be able to continuously use a service used based on the second PDU session 402 after performing the EPS fallback and then returning to the 5GS.

Alternatively, referring to FIG. 4B as another comparative example, an electronic device 101 may perform an EPS fallback in a state in which a first PDU session 401 and a second PDU session 402 are established. The electronic device 101 may establish (or convert) a first PDN connection 411 corresponding to the first PDU session 401 and a second PDN connection 412 corresponding to the second PDU session 402 in a state of being registered in the EPS. In the comparative example of FIG. 4B, compared with a comparative example of FIG. 4A, the second PDN connection 412 corresponding to the second PDU session 402 may also be established. The electronic device 101 may return to the 5GS. The electronic device 101 may establish a first PDU session 421 corresponding to the first PDN connection 411 and a second PDU session 422 corresponding to the second PDN connection 412. There is a possibility that a characteristic of the second PDU session 422 may be different from a characteristic of the second PDU session 402 before the EPS fallback. For example, the QFI of a QoS flow included in the second PDU session 402 may be different from the QFI of a QoS flow included in the second PDU session 422. Since a specific QoS flow before the EPS fallback may be configured in the network to be suitable for a specific service, there is a possibility that the service before the EPS fallback may be affected by a change in the QFI of the QoS flow. In one example, it is assumed that the second PDU session 402 includes a DNN of "Internet" and S-NSSAI of "B". In this case, the second PDN connection 412 corresponding to the second PDU session 402 may be established to have an APN of "Internet", but the information of the S-NSSAI may be deleted. Accordingly, after returning to the 5GS, the second PDU session 422 corresponding to the second PDN connection 412 may include the DNN of "Internet" and S-NSSAI of "C" rather than "B".

Table 2 illustrates a mapping relationship between a PDU session in a 5GS, a PDN connection after an EPS fallback, and a PDU sessions after returning to the 5GS according to various examples.

TABLE 2

| 5GS | | EPS | | 5GS | |
|---|---|---|---|---|---|
| PDU1 | DNN:IMS S-NSSAI:A | PDN 1' | APN: IMS | PDU 1" | DNN:IMS S-NSSAI:A |
| PDU2 | DNN:Internet S-NSSAI:A | PDN 2' | APN: Internet | PDU 2" | DNN:Internet S-NSSAI:A |
| PDU3 | DNN:Internet S-NSSAI:B | | | | |
| PDU4 | DNN:Streaming S-NSSAI:B | | | | |

In an example of Table 2, in the initial 5GS, a first PDU session (PDU1) with a DNN of "IMS" and S-NSSAI of "A", a second PDU session (PDU2) with a DNN of "Internet" and the S-NSSAI of "A", a third PDU session (PDU3) with the DNN of "IMS" and S-NSSAI of "B", and a fourth PDU session (PDU4) with a DNN of "streaming" and the S-NSSAI of "B" may be established. After the EPS fallback, the electronic device 101 may establish a first PDN connection (PDN1') with an APN of "IMS" corresponding to the first PDU session (PDU1) and a second PDN connection (PDN2') with an APN of "Internet" corresponding to at least some of the PDU sessions (PDU2, PDU3, and PDU4). After returning to the 5GS, the electronic device 101 may establish a first PDU session (PDU1") with the DNN of "IMS" corresponding to the first PDN connection (PDN1') and a second PDU connection (PDU2") with the DNN of "Internet" and the S-NSSAI of "A" corresponding to the second PDN connection (PDN2'). Comparing a pre-EPS fallback and a post-EPS fallback, the third PDU session (PDU3) and the fourth PDU session (PDU4) are lost, and accordingly there is a possibility the electronic device 101 may perform a service based on the third PDU session (PDU3) and the fourth PDU session (PDU4). Alternatively, the electronic device 101 may declare a local release without establishing a PDN connection corresponding to the fourth PDU session (PDU4), and even in this case, there is a possibility that the fourth PDU session PDU4 may be lost.

Figure 5:
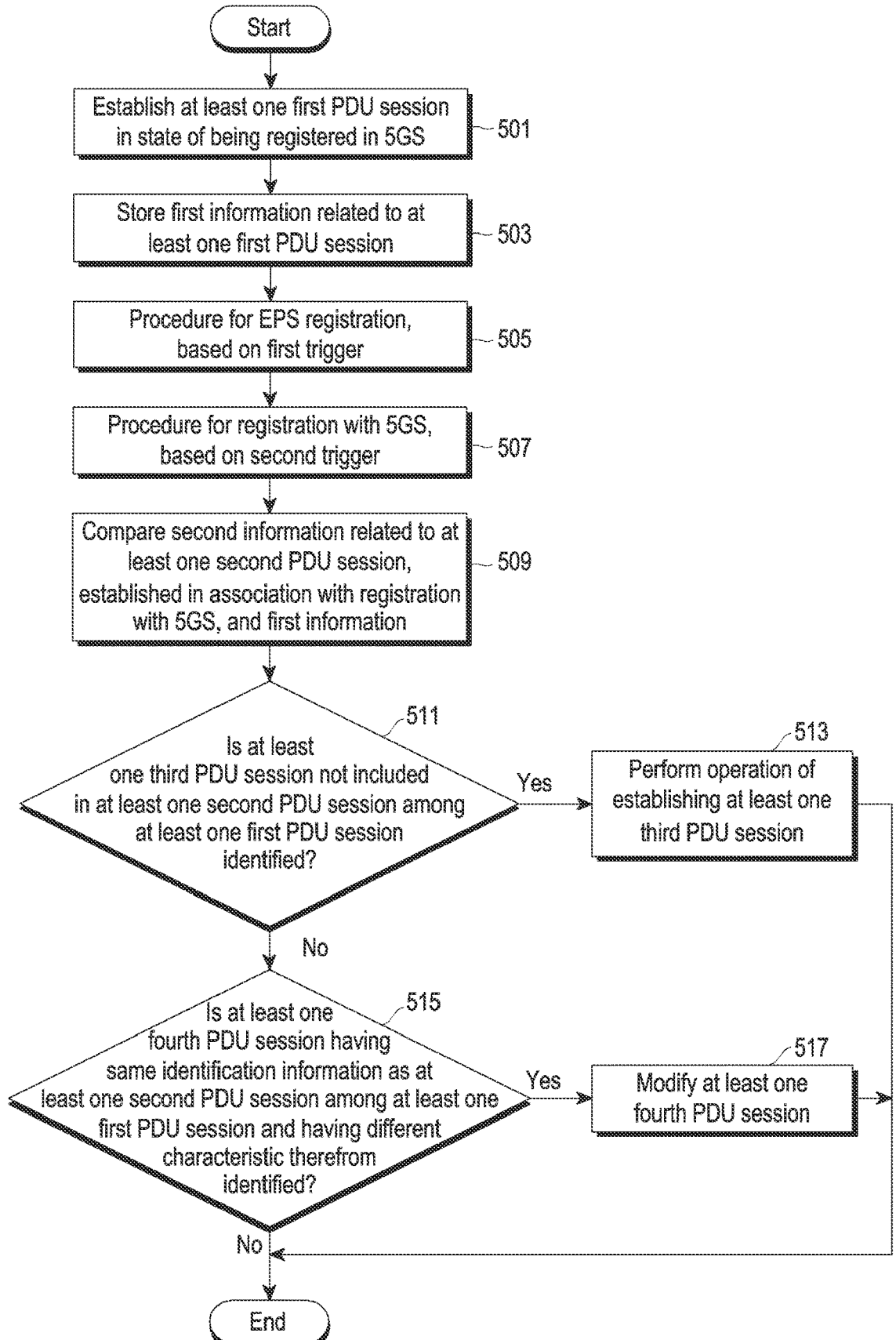
FIG. 5 is a flowchart illustrating an operating method of an electronic device according to an embodiment of the disclosure.

FIG. 5 is a flowchart illustrating an operating method of an electronic device according to an embodiment of the disclosure. An embodiment of FIG. 5 is described with reference to FIGS. 6A and 6B.

Figure 6A:
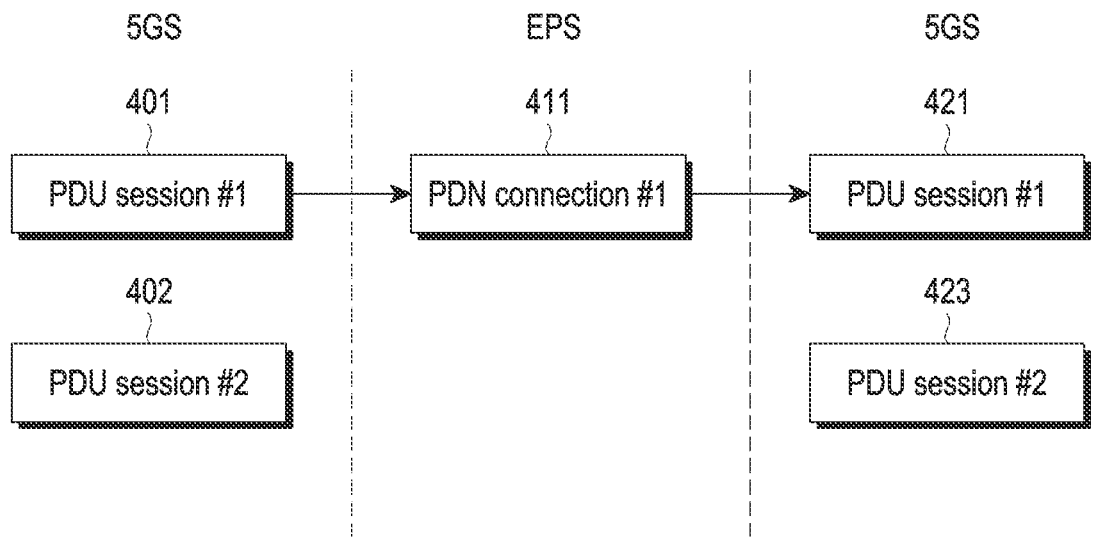
FIGS. 6A and 6B illustrate a PDU session and a PDN connection established in an electronic device according to various embodiments of the disclosure.
Figure 6B:
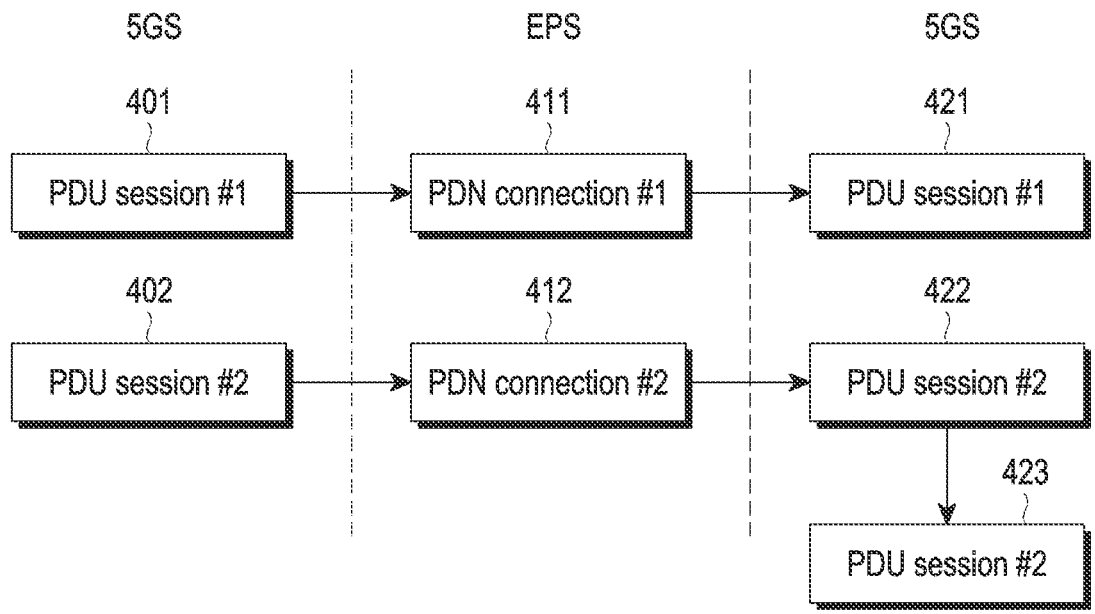

FIGS. 6A and 6B illustrate a PDU session and a PDN connection established in an electronic device according to various embodiments of the disclosure.

Referring to FIG. 5, according to various embodiments, in operation 501, an electronic device 101 (e.g., at least one of a processor 120 of FIG. 1, FIG. 2A, or FIG. 2B, a first communication processor 212 of FIG. 2A, a second communication processor 214 of FIG. 2A, or an integrated communication processor 260 of FIG. 2B) may establish at least one first PDU session in a state of being registered in a 5GS. For example, the electronic device 101 may transmit a PDU session establishment request to a network, and PDU session establishment will be described with reference to FIG. 7A.

According to various embodiments, in operation 503, the electronic device 101 may store first information related to the at least one first PDU session. For example, the electronic device 101 may store at least one of network information (e.g., at least one of a PLMN, s TAC, or s cell ID) about the first PDU session, PDU session information (e.g., at least one of a session and service continuity (SSC) mode, an always-on mode, a PDU session type, a DNN, S-NSSAI, a PSI, a QFI, or a mapped EBI), or QoS information (e.g., at least one of a QoS rule or QoS flow information), but the first information is not limited to a specific type. When a plurality of PDU sessions is established, the electronic device 101 may store relevant information about each of the plurality of PDU sessions.

According to various embodiments, in operation 505, the electronic device 101 may perform a procedure for EPS registration (or EPC registration), based on a first trigger. For example, the electronic device 101 may perform the procedure for EPS registration upon receiving a handover command from the network or an RRC release message including redirection information from the network. For example, the electronic device 101 may detect a cell for an EPS fallback, may perform a random access channel (RACH) procedure, and may perform a TAU procedure or an attach procedure. After performing EPS registration, the electronic device 101 may perform a service requiring an EPS fallback (e.g., an IMS voice service or an emergency service). The electronic device 101 may transmit a TAU request message or an attach request including a mapped EBI during an EPS registration process. The electronic device 101 may receive a TAU accept message from the network, and the TAU accept message may include an EBI. The electronic device 101 may establish a PDN connection between the network and the EBI included in the TAU accept message. The electronic device 101 may store information related to the PDN connection. For example, the electronic device 101 may store, as the information related to the PDN connection, network information (e.g., at least one of a PLMN, a TAC, or a cell ID), PDN connection information (e.g., at least one of an EBI, an APN, or a PDN type), or QoS information (e.g., at least one of a QoS rule in a protocol configuration options (PCO) or a description), but there is no limitation on the information.

According to various embodiments, in operation 507, the electronic device 101 may perform a procedure for registration with the 5GS, based on a second trigger. For example, after the service requiring the EPS fallback is terminated, the electronic device 101 may receive a handover command in which a cell supporting the 5GS is designated as a target cell from the network. The electronic device 101 may identify reception of the handover command as the second trigger and may perform the procedure for registration with the 5GS. For example, the electronic device 101 may detect the target cell, may perform a RACH procedure, and may perform registration (e.g., a registration procedure) with the 5GS. The procedure for registration with 5GS may include transmission of a registration request message by the electronic device 101.

According to various embodiments, in operation 509, the electronic device 101 may compare second information related to at least one second PDU session, established in association with the registration with the 5GS, with the first information. In one example, when an N26 interface is supported in the network, the electronic device 101 may transmit the registration request message including an EBI, for example, the EBI corresponding to the PDN connection established in the EPS registration, to the network. In another example, when the N26 interface is not supported in the network, the electronic device 101 may transmit a PDU session establishment request message including an EBI, for example, the EBI corresponding to the PDN connection established in the EPS registration, to the network after performing the procedure for the registration with the 5GS. Accordingly, the electronic device 101 may establish the at least one second PDU session with the network. The electronic device 101 may compare the second information about the second PDU session with the first information by each item.

According to various embodiments, in operation 511, the electronic device 101 may determine whether at least one third PDU session not included in the at least one second PDU session among the at least one first PDU session is identified. When the at least one third PDU session not included in the at least one second PDU session among the at least one first PDU session is identified (Yes in 511), the electronic device 101 may perform an operation of establishing the at least one third PDU session in operation 513. For example, referring to FIG. 6A, the electronic device 101 may establish at least one PDU session, for example, a first PDU session 401 and a second PDU session 402, in a state being registered with the 5GS. After an EPS fallback, the electronic device 101 may establish a first PDN connection 411 corresponding to the first PDU session 401 but may not establish a PDN connection corresponding to the second PDU session 402. For the same reason as described with reference to FIG. 4A, the PDN connection corresponding to the second PDU session 402 may not be established. When returning to the 5GS, the electronic device 101 may establish a first PDU session 421 corresponding to the first PDN connection 411. However, since no PDN connection corresponding to the second PDU session 402 is established, only the first PDU session 421 may be established after returning to the 5GS. The electronic device 101 may compare information related to the PDU sessions before the EPS fallback with information related to the PDU session after the EPS fallback and then the return to the 5GS. The electronic device 101 may identify that the second PDU session 402 among the PDU sessions before the EPS fallback does not exist after the return. The electronic device 101 may establish a second PDU session 423, based on information related to the second PDU session 402. For example, the electronic device 101 may transmit a PDU session establishment message to the network, and the PDU session establishment message may include at least part of the information related to the existing second PDU session 402. Accordingly, after returning to the 5GS, the electronic device 101 may establish both the first PDU session 421 corresponding to the first PDU session 401 and the second PDU session 423 corresponding to the second PDU session 402 and may perform a previously implemented service.

According to various embodiments, in operation 515, the electronic device 101 may identify whether at least one fourth PDU session having the same identification information as the at least one second PDU session among the at least one first PDU session and having a different characteristic therefrom is identified. When the at least one fourth PDU session having the same identification information as the at least one second PDU session among the at least one first PDU session and having the different characteristic therefrom is identified (Yes in 515), the electronic device 101 may perform an operation of modifying the at least one fourth PDU session in operation 517. For example, referring to FIG. 6B, the electronic device 101 may establish at least one PDU session, for example, a first PDU session 401 and a second PDU session 402, in a state being registered with the 5GS. After an EPS fallback, the electronic device 101 may establish a first PDN connection 411 corresponding to the first PDU session 401 and a second PDN connection 412 corresponding to the second PDU session 402. When returning to the 5GS, the electronic device 101 may establish a first PDU session 421 corresponding to the first PDN connection 411 and a second PDU session 422 corresponding to the second PDN connection 412. However, as described with reference to FIG. 4B, a characteristic (e.g., S-NSSAI) of the second PDU session 422 may be different from a characteristic (e.g., S-NSSAI) of the second PDU session 402 before the EPS fallback. As the characteristics of the corresponding PDU sessions (e.g., the second PDU sessions 402 and 422) before the EPS fallback and after returning to the 5GS are different, the electronic device 101 may perform an operation of modifying the characteristic of the second PDU session 422 established after returning to the 5GS. For example, the electronic device 101 may transmit a PDU session modification request message to the network. The PDU session modification request message may include identification information (e.g., at least one of a PSI, a corresponding EBI, or a QFI) about the PDU session to be modified and modification information but is not limited thereto. Accordingly, a modified second PDU session 423 may be established between the electronic device 101 and the network, and a characteristic of the modified second PDU session 423 may be the same of the characteristic of the second PDU session 402 before the EPS fallback. Accordingly, the electronic device 101 can perform communication in the same environment as an environment in which the PDU sessions 401 and 402 before the EPS fallback are established, thus performing a service before the EPS fallback.

FIG. 5 shows that operation 511 is performed before operation 515 is performed, which is only one example. According to various embodiments, operation 515 may be performed before operation 511 is performed, or operation 511 and operation 515 may be performed at least simultaneously, and it will be understood by those skilled in the art that there is no limitation on the order of the operations. Further, it will be understood by those skilled in the art that either operation 511 or operation 515 may be omitted in various embodiments.

In various embodiments, the processor 120 may perform operation 511 and/or operation 515 and may request the communication processor (at least one of the first communication processor 212, the second communication processor 214, or the integrated communication processor 260) to perform subsequent operation 513 and/or operation 517. Alternatively, the communication processor (e.g., at least one of the first communication processor 212, the second communication processor 214, or the integrated communication processor 260) may perform at least one of operation 511, operation 513, operation 515, or operation 517.

Figure 7A:
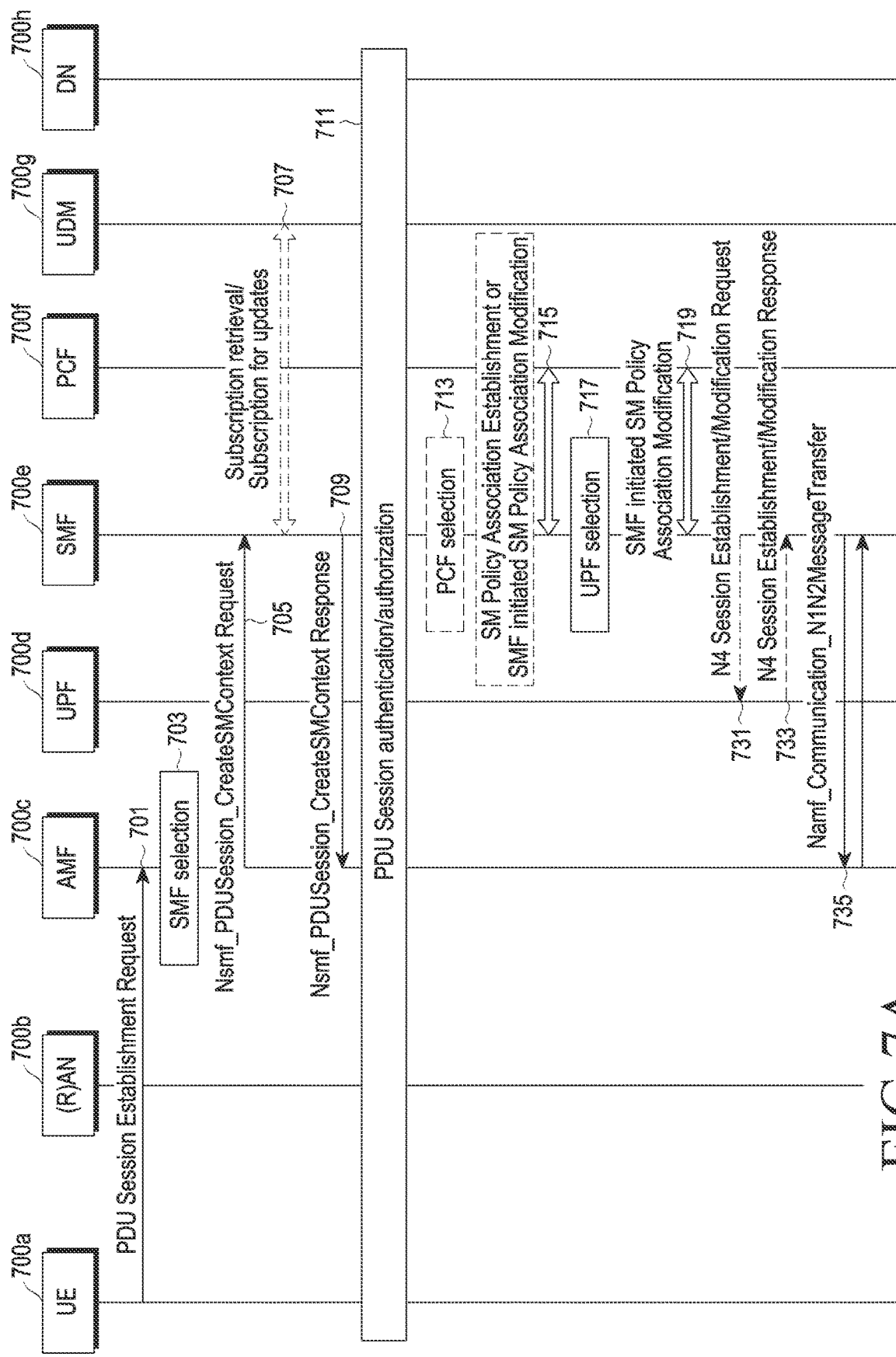
FIGS. 7A and 7B are flowcharts illustrating a PDU session establishment process according to various embodiments of the disclosure.
Figure 7B:
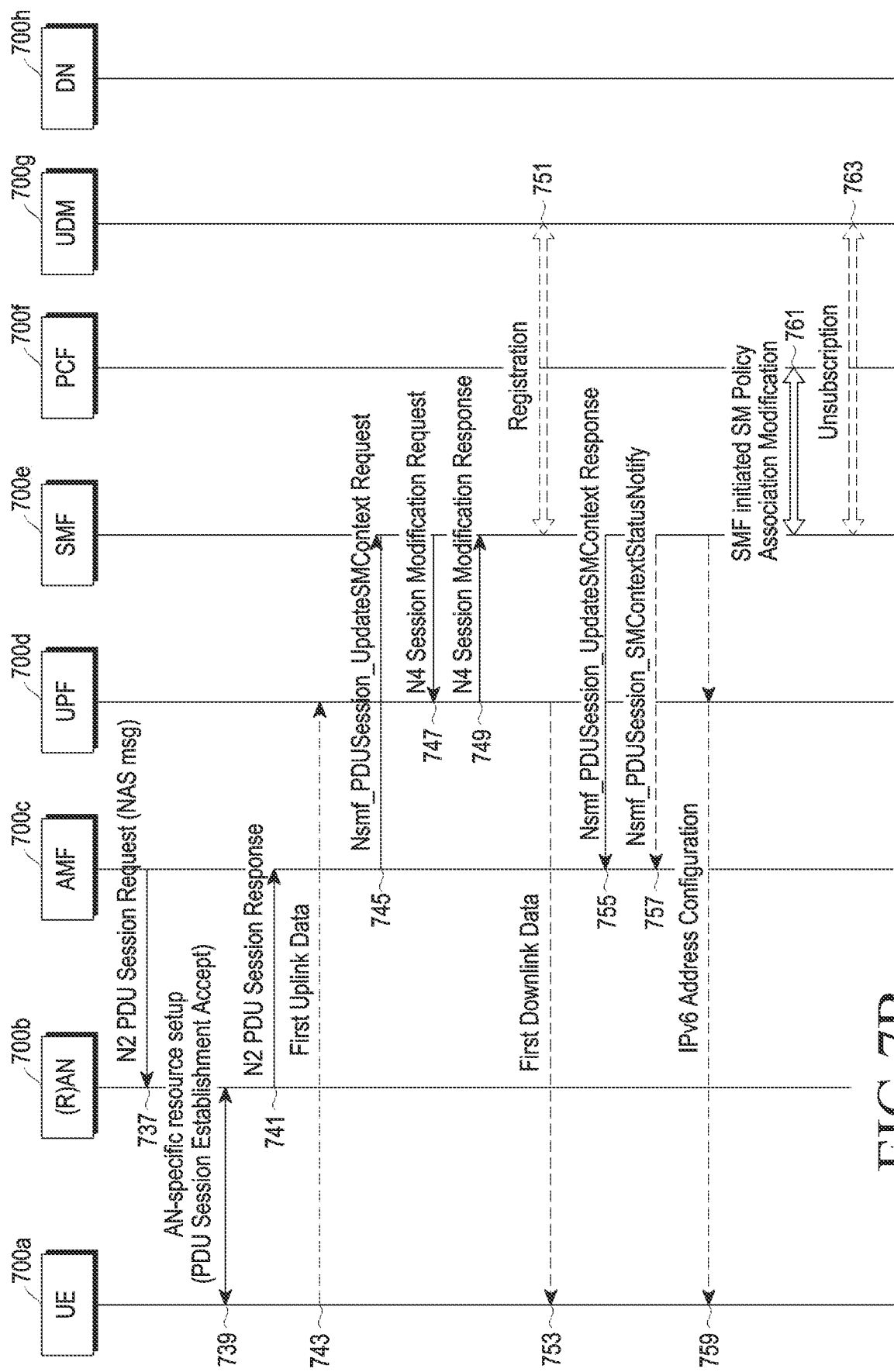

FIGS. 7A and 7B are flowcharts illustrating a PDU session establishment process according to various embodiments of the disclosure.

Referring to FIG. 7A, according to various embodiments, in operation 701, a UE 700a (e.g., an electronic device 101) may transmit a PDU session establishment request message to an AMF 700c in a state of being registered with a 5GS. For example, a PDU session establishment request is a network access stratum (NAS) message and may include at least one of S-NSSAI, a DNN, a PDU session ID, a requested PDU session type, a requested SSC mode, a 5GSM capability PCO, an SM PDU DN request container, or the number of packet filters. To establish a new PDU session, the UE 700a may generate a new PDU session ID. The AMF 700c may receive the PDU session establishment request message, which is the NAS message, through an (R)AN 700b.

According to various embodiments, in operation 703, the AMF 700c may select an SMF 700e corresponding to the received PDU session establishment request message. For example, the AMF 700c may select the SMF 700e corresponding to the S-NSSAI and the DNN of the PDU session establishment request message. When the S-NSSAI is not included in the PDU session establishment request message, the AMF 700c may select default S-NSSAI. When the S-NSSAI is included in the PDU session establishment request message but the DNN is not included, the AMF 700c may select a default DNN as a DNN for a requested PDU session.

According to various embodiments, in operation 705, the AMF 700c may transmit a Nsmf_PDUSession_CreateSMContext Request to the selected SMF 700e. For example, the AMF 700c may transmit the S-NSSAI from allowed NSSAI to the SMF 700e. In operation 707, the SMF 700e may perform subscription retrieval/subscription for updates with a UDM 700g. For example, the SMF 700e may perform registration of the UDM 700g using Nudm_UECM_Registration for a given PDU session. The UDM 700g may store at least one of a SUPI, an SMF identity, an SMF address and an associated DNN, or a PDU session ID. In operation 709, the SMF 700e may transmit an Nsmf_PDUSession_CreateSMContext Response to the AMF 700c. In operation 711, a PDU session authentication/authorization procedure may be performed. When a PDU session already exists or when a request is made according to an emergency service, operation 711 may be omitted.

According to various embodiments, when dynamic policy and charging control (PCC) is deployed and a PCF ID is provided by the AMF 700c, the SMF 700e may perform PCF selection in operation 713. In operation 715, the SMF 700e may establish a PDU session with a PCF 700f by performing an SM policy association establishment procedure, and may obtain a default PCC rule for the PDU session or may perform an SM policy association modification procedure. In operation 717, the SMF 700e may select the SSC mode for the PDU session and may select a UPF. The SMF 700e may assign an IP address/prefix to the PDU session. In operation 719, the SMF 700e may perform an SM policy association modification procedure and may thus provide a policy control request trigger condition. The SMF 700e may perform an N4 session establishment procedure with the selected UPF 700d. For example, in operation 731, the SMF 700e may transmit an N4 session establishment/modification request to the UPF 700d. In operation 733, the UPF 700d may perform a response by transmitting an N4 session establishment/modification response. Here, CN tunnel information may be provided to the SMF 700e. In operation 735, the SMF 700e may transmit Namf_Communication_NIN2MessageTransfer to the AMF 700c. Namf_Communication_NIN2MessageTransfer may include information (e.g., a PDU session ID, N2 SM information, and an N1 SM container) related to the PDU session. The N2 SM information may include at least one of the PDU session ID, a QFI(s), a QoS profile(s), CN tunnel information, the S-NSSAI from the allowed NSSAI, a session-AMBR, a PDU session type, user plane security enforcement information, or UE integrity protection maximum data rate. The N1 SM container may include PDU session establishment accept to be transmitted to the UE 700a, and the PDU session establishment accept may include least one of a QoS rule(s), a QoS flow level, QoS parameters, QoS rule(s), the SSC mode, the S-NSSAI(s), the DNN, an allocated IPv4 address, an interface identifier, the session-AMBR, a selected PDU session type, a reflective QoS timer, or a P-CSCF address.

Referring to FIG. 7B, according to various embodiments, in operation 737, an AMF 700c may transmit an N2 PDU session request to a (R)AN 700b, and this request may include the N2 SM information and a NAS message. The NAS message may include the PDU session ID and the N1 SM container, and the N1 SM container may include the PDU session establishment accept. In operation 739, the (R)AN 700b may perform AN-specific resource setup. For example, the (R)AN 700b may perform an AN-specific signaling exchange with the UE 700a associated with the information received from the AMF 700c. For example, an NG-RAN may perform RRC connection reconfiguration with the UE 700a. The (R)AN 700b may forward a NAS message including the PDU session ID and the N1 SM container (PDU session establishment accept) to the UE 700a. In operation 741, the (R)AN 700b may transmit an N2 PDU session response to the AMF 700c, and this response may include the PDU session ID, Cause and the N2 SM information. The N2 SM information may include the PDU session ID, the AN tunnel information, a list of an accepted/rejected QFI(s), and a user plane enforcement policy notification. Accordingly, first uplink data may be transmitted from the UE 700a to the UPF 700d in operation 743.

According to various embodiments, in operation 745, the AMF 700c may transmit an Nsmf_PDUSession_UpdateSMContext Request to the SMF 700e, and this request may include the N2 SM information and a request type. The AMF 700c may forward the N2 SM information, received from the (R)AN 700b, to the SMF 700e. when the N2 SM information includes a list of a rejected QFI, the SMF 700e may release a QoS profile associated with the rejected QFI. The SMF 700e may perform an N4 session modification procedure with the UPF 700d. In operation 747, the SMF 700e may transmit an N4 session modification request to the UPF 700d. For example, the SMF 700e may provide the AN tunnel information to the UPF 700d. In operation 749, the UPF 700d may provide an N4 session modification response to the SMF 700e. Subsequently, the UPF 700d may transmit a downlink packet directed to the UE 700a, which is buffered for the PDU session. Accordingly, in operation 753, first downlink data may be provided from the UPF 700d to the UE 700a. In operation 755, the SMF 700e may transmit an Nsmf_PDUSession_UpdateSMContext Response to the AMF 700c. Accordingly, the AMF 700c may forward a relevant event subscribed to by the SMF 700e. In operation 757, the SMF 700e may transmit Nsmf_PDUSession_SMContextStatusNotify to AMF 700c, which may be conditionally performed and may cause release. In operation 759, the SMF 700e may provide an IPV6 address configuration to the UE 700a through the UPF 700d. When the PDU session type is IPV6 or IPv4v6, the SMF 700e may generate an IPV6 router advertisement and may transmit the same to the UE 700a. When establishment of the PDU session fails, the SMF 700e may perform an SM policy modification with the PCF 700f in operation 761 and may perform unsubscription with the UDM 700g in operation 763. The UDM 700g may update UE context by Nudr_DM_Update. Through the foregoing process, the UE 700a (e.g., the electronic device 101) may establish PDU sessions 401 and 402 as shown in FIG. 6A or 6B in a state of being registered with the 5GS, which is described in an embodiment with reference to FIG. 7C.

Figure 7C:
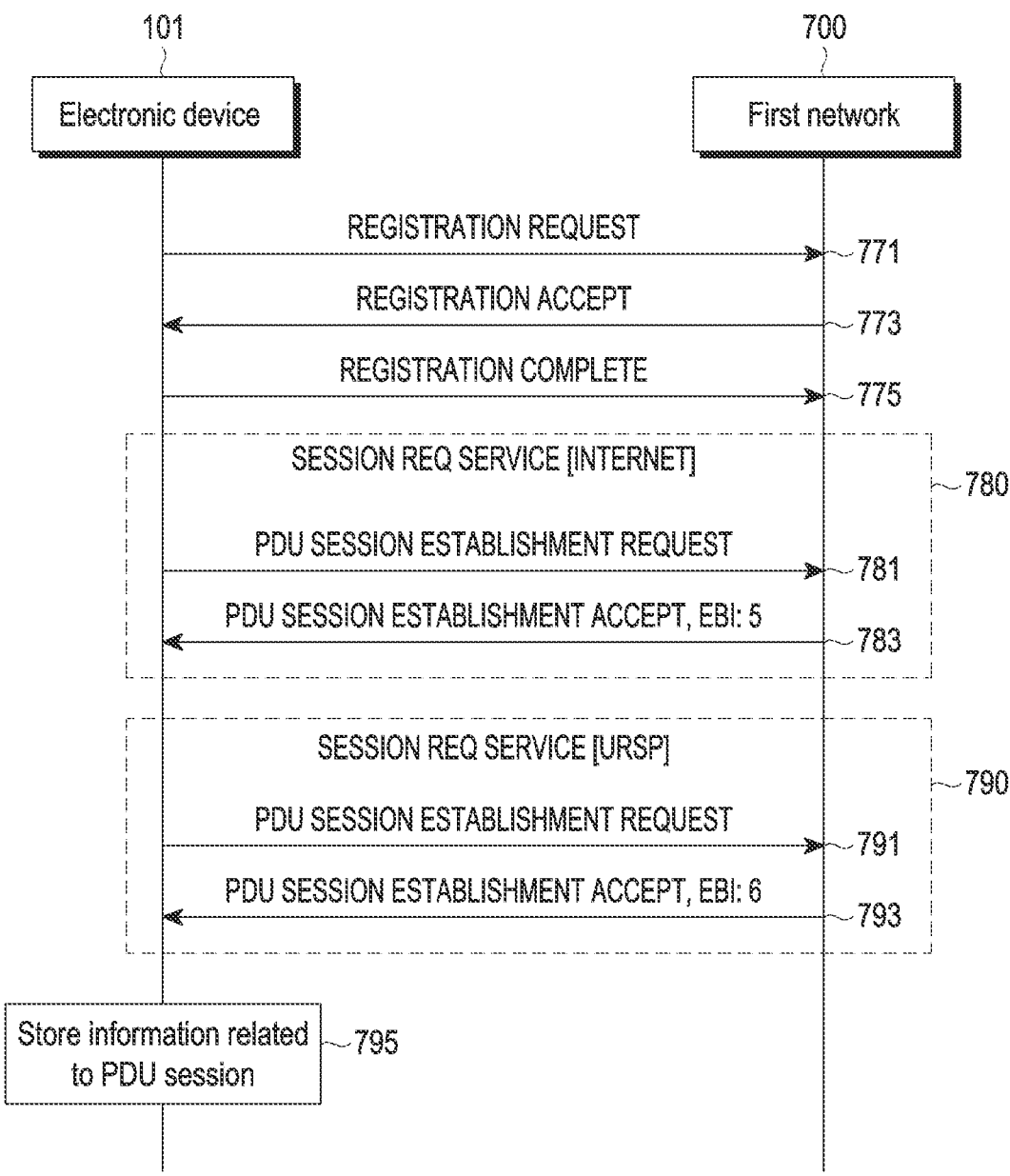
FIG. 7C is a flowchart illustrating an operating method of an electronic device according to an embodiment of the disclosure.

FIG. 7C is a flowchart illustrating an operating method of an electronic device according to an embodiment of the disclosure.

Referring to FIG. 7C, an electronic device 101 may perform a procedure for registration with a first network 700 corresponding to the 5GS. In operation 771, the electronic device 101 (e.g., at least one of the processor 120 of FIG. 1, FIG. 2A, or FIG. 2B, the first communication processor 212 of FIG. 2A, the second communication processor 214 of FIG. 2A, or the integrated communication processor 260 of FIG. 2B) may transmit a registration request for registration with the 5GS to the first network 700 corresponding to the 5GS. In operation 773, the first network 700 may transmit a registration accept to the electronic device 101. In operation 775, the electronic device 101 may transmit a registration complete to the first network 700. The procedure for the registration may be performed, for example, based on 3rd generation partnership project (3GPP) technical specification (TS) 23.501.

According to various embodiments, the electronic device 101 may perform a procedure 780 for establishing a first PDU session of a DNN of "Internet" in a state of being registered with the 5GS. In operation 781, the electronic device 101 may transmit a PDU session establishment request message to the first network 700. For example, the PDU session establishment request message may include a PDU session ID (e.g., PSI=5) and information about the DNN of "Internet". For example, the PDU session establishment request message may include S-NSSAI. In the first network 700, for example, operations as described with reference to FIGS. 7A and 7B may be performed. In operation 783, the first network 700 may transmit a PDU session establishment accept message to the electronic device 101. For example, the PDU session establishment accept message may include the PDU session ID and a mapped EBI (e.g., EBI=5).

According to various embodiments, the electronic device 101 may perform a procedure 790 for establishing a second PDU session using a UE route selection policy (URSP) rule in the state of being registered with the 5GS. In operation 791, the electronic device 101 may transmit a PDU session establishment request message to the first network 700. For example, the PDU session establishment request message may include a PDU session ID (e.g., PSI=6), S-NSSAI identified based on the URSP rule, and information about a DNN corresponding to the S-NSSAI. In the first network 700, for example, operations as described with reference to FIGS. 7A and 7B may be performed. In operation 793, the first network 700 may transmit a PDU session establishment accept message to the electronic device 101. For example, the PDU session establishment accept message may include the PDU session ID and a QoS flow description, and the QoS flow description may include a mapped EBI (e.g., EBI=6).

In operation 795, the electronic device 101 may store information related to the PDU sessions, for example, information related to the first PDU session and information related to the second PDU session. As described above, the electronic device 101 may establish the PDU sessions in the state of being registered with 5GS and may perform an EPS fallback. Hereinafter, a process for an EPS fallback according to an embodiment will be described with reference to FIGS. 8A and 8B.

Figure 8A:
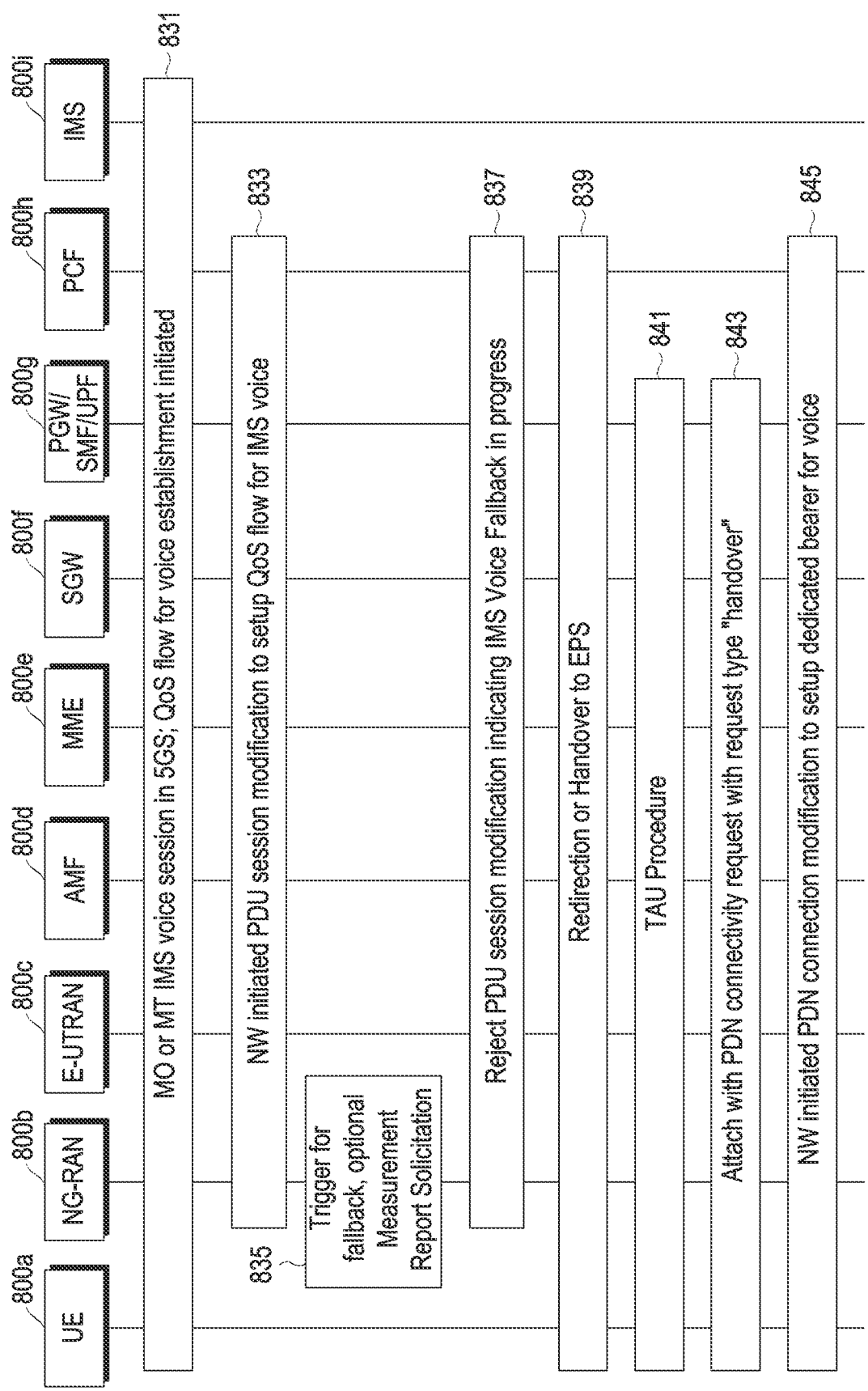
FIG. 8A is a flowchart illustrating an evolved packet system (EPS) fallback according to an embodiment of the disclosure.

FIG. 8A is a flowchart illustrating an EPS fallback according to an embodiment of the disclosure.

Referring to FIG. 8A, according to various embodiments, a UE 800a (e.g., an electronic device 101) may camp on an NG-RAN 800b in a 5GS. In operation 831, an MO or MT IMS voice session in a 5GS may be established by the UE 800a, a network (e.g., 800b, 800c, 800d, 800e, 800f, 800g, and 800h), and an IMS server 800i, and establishment of a QoS flow for a voice may be initiated. In operation 833, the second network (e.g., 800b, 800c, 800d, 800e, 800f, 800g, and 800h) may perform PDU session modification for setting up the QoS flow for an IMS voice. An NG-RAN 800b may support an EPS fallback for the IMS voice, and in operation 835, the NG-RAN 800b may determine to trigger the fallback. The NG-RAN 800b may determine to trigger the fallback, based on UE capability, an indication of "Redirection for EPS fallback for voice is possible" from an AMF 800d, a network configuration (e.g., a setting for N26 availability), and a radio condition. The NG-RAN 800b may optionally start a measurement report request from the UE 800a including an E-UTRAN as a target. In operation 837, the NG-RAN 800b may reject the PDU session modification for setting up the QoS flow for the IMS voice and may indicate that a movement by the fallback for the IMS voice is in progress.

According to various embodiments, in operation 839, the NG-RAN 800b may initiate a handover or an inter-system redirection to an EPS in consideration of the UE capability. The UE 800a may receive a handover command or an RRC release message including redirection information from the network. The UE 800a may perform a handover procedure or a redirection procedure. For example, the UE 800a may retrieve a target cell, based on information included in the handover command, and may perform an RACH procedure with the target cell, based on a retrieval result. For example, the UE 800a may retrieve a cell, based on the information included in the RRC release message, and may perform an RACH procedure with the selected cell, based on a retrieval result. When the UE 800a performs a handover or performs a redirection procedure in which an N26 interface is supported, the UE 800a may perform a tracking area update (TAU) procedure in operation 841. When the UE 800a performs a redirection procedure in which the N26 interface is not supported, the UE 800a performs an attach procedure using a PDN connectivity request of a request type of "handover" in operation 843. When the movement to the EPS is completed, the network may perform a PDN connection modification procedure for setting up a dedicated bearer for the voice in operation 845.

Figure 8B:
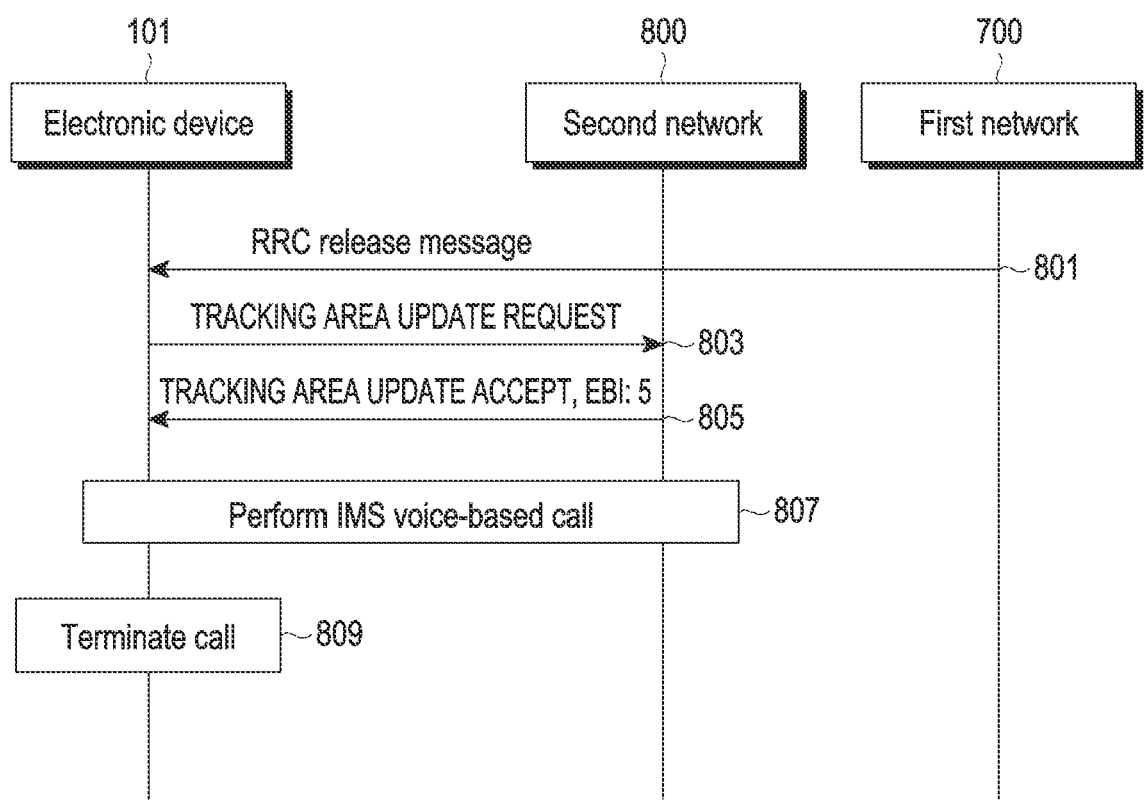
FIG. 8B is a flowchart illustrating an operating method of an electronic device according to an embodiment of the disclosure.

FIG. 8B is a flowchart illustrating an EPS fallback according to an embodiment of the disclosure.

According to various embodiments, it is assumed that an electronic device 101 (e.g., at least one of the processor 120 of FIG. 1, FIG. 2A, or FIG. 2B, the first communication processor 212 of FIG. 2A, the second communication processor 214 of FIG. 2A, or the integrated communication processor 260 of FIG. 2B) has established two PDU sessions in a state of being registered in a 5GS as in FIG. 7C before operation 801 of FIG. 8B is performed. Referring to FIG. 8B, in operation 801, the electronic device 101 may receive an RRC release message for an EPS fallback from a first network 700 corresponding to the 5GS. Although FIG. 8B shows that the electronic device 101 performs a redirection procedure, it will be understood by those skilled in the art that the electronic device 101 may perform a handover procedure according to various embodiments. The electronic device 101 may perform cell retrieval and cell selection upon receiving the RRC release message, and may perform a RACH procedure with a selected cell. In operation 803, the electronic device 101 may transmit a tracking area update (TAU) request through a second network 800 corresponding to an EPS, for example, a cell with which an RRC connection is established. The TAU request may include, for example, an EBI (e.g., EBI=5) of a PDN connection. In operation 805, the electronic device 101 may receive a tracking area update (TAU) accept from the second network 800. The TAU accept may include, for example, the EBI (e.g., EBI=5) corresponding to the PDN connection. For example, in FIG. 8B, it is assumed that PDN connections corresponding to some PDU sessions among a plurality of PDU sessions are not established. For example, among a first PDU session having EBI=5 and PSI=5 and a second PDU session having EBI=6 and PSI=6, only a PDN connection corresponding to the first PDU session is established, while a PDN connection corresponding to the second PDU session may not be established. The PDN connection may have the EBI of 5. In operation 807, the electronic device 101 may perform an IMS voice-based call, based on the PDN connection. In operation 809, the electronic device 101 may terminate the call. As described above, the electronic device 101 may perform the EPS fallback, may perform the IMS voice-based call, and may return to the 5GS when the call is terminated. Hereinafter, a process of returning to the 5GS according to an embodiment will be described with reference to FIGS. 9 and 10.

Figure 9:
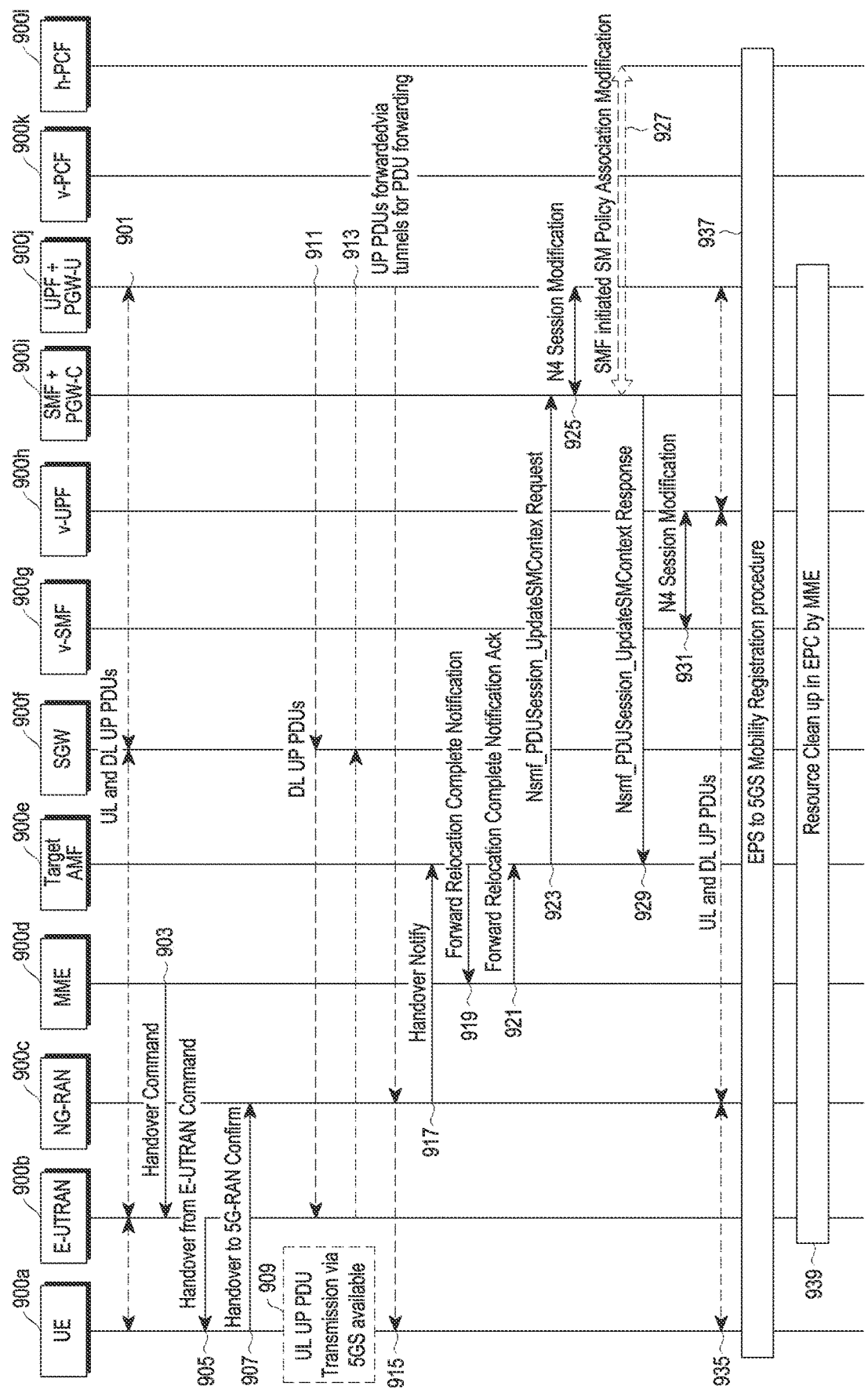
FIG. 9 is a flowchart illustrating a handover from an EPS using an N26 interface to a 5GS according to an embodiment of the disclosure.

FIG. 9 is a flowchart illustrating a handover from an EPS using an N26 interface to a 5GS according to an embodiment of the disclosure. The N26 interface may provide seamless session continuity in a single registration mode. For example, in home-routed roaming, an SMF+PGW-C 900i may receive a PDU session ID from a UE 900a and may provide a different 5G QOS parameter to the UE 900a, which may be applied even when a home PLMN (HPLMN) performs an interworking procedure without the N26 interface. In an embodiment of FIG. 9, it is assumed that the electronic device 101 is in a state of being registered in the EPS after an EPS fallback.

Referring to FIG. 9, according to various embodiments, in operation 901, a UE 900a (e.g., an electronic device 101) may transmit and receive uplink and downlink user plane PDUs (UL and DL UP PDUs) to and from a UPF+PGW-U 900j through an E-UTRAN 900b and an SGW 900f. In operation 903, an MME 900d may transmit a handover command to the E-UTRAN 900b. In operation 905, the E-UTRAN 900b may transmit the handover command from the E-UTRAN 900b to the UE 900a. In operation 907, the UE 900a may transmit a confirmation of a handover to a 5G-RAN, for example, the NG-RAN 900c, to the NG-RAN 900c. The UE 900a may move from the E-UTRAN 900b and may perform synchronization with the target NG-RAN 900c. In operation 909, the UE 900a may be in a state of being able to transmit an uplink user plane PDU (UL UP PDU) via the 5GS. DL UP PDUs and UL UP PDUs may be transmitted and received between the E-UTRAN 900b, the SGW 900f, and the UPF+PGW-U 900j in operation 911 and operation 913, and PDUs may be transmitted through the NG-RAN 900c in operation 915, for example, UP PDUs may be forwarded through a tunnel for PDU forwarding. The UE 900a may resume uplink transmission of user plane data only for QFIs and session IDs having radio resources allocated to the NG-RAN 900c. A v-UPF 900h may forward PDUs to the NG-RAN 900c using N3 tunnel information.

According to various embodiments, in operation 917, the NG-RAN 900c may notify a target AMF 900e that the UE 900a is handed over to the NG-RAN 900c. A notification message may include N2 SM information (e.g., N3 DL AN Tunnel Info). The target AMF 900e may identify that the UE 900a has arrived at a target side. In operation 919, the target AMF 900e may transmit a forward relocation complete notification message to the MME 900d, thereby notifying that the UE 900a has arrived at the target side. In operation 921, the MME 900d may transmit a forward relocation complete notification acknowledgement message to the target AMF (900e). In operation 923, the target AMF 900e may transmit a Nsmf_PDUSession_UpdateSMContext Request to the SMF+PGW-C 900i. The Nsmf_PDUSession_UpdateSMContext Request may be a handover completion confirmation with respect to a PDU session ID. The handover completion may be transmitted to identify success of the N2 handover for each PDU session. In operation 925, the SMF+PGW-C 900i may perform N4 session modification with the SMF+PGW-U 900j. The SMF+PGW-C 900i may update the SMF+PGW-U 900j on V-CN tunnel information, which indicates that a downlink user plane of a specified PDU session is changed to the NG-RAN 900c and that a CN tunnel for an EPS bearer corresponding to the PDU session can be released. In operation 927, the SMF+PGW-C 900i may perform an SM policy association modification procedure with an h-PCF 9001. When a PCC infrastructure is used, the SMF+PGW-C 900i may report, for example, that a RAT type and a UE location are changed. In operation 929, the SMF+PGW-C 900i may transmit a Nsmf_PDUSession_UpdateSMContext Response, which may include a PDU session ID. The SMF+PGW-C 900i may confirm reception of the handover completion. In operation 931, a v-SMF 900g may provide N3 DL AN Tunnel Info and N9 UL CN Tunnel Info to a v-UPF 900h. In operation 935, the UE 900a may transmit and receive UL and DL UP PDUs to and from the UPF+PGW-U 900j via the NG-RAN 900c. In operation 937, the UE 900a may perform an EPS-to-5GS mobility registration procedure. In operation 939, the MME 900d may clean up a resource in the EPC.

Figure 10:
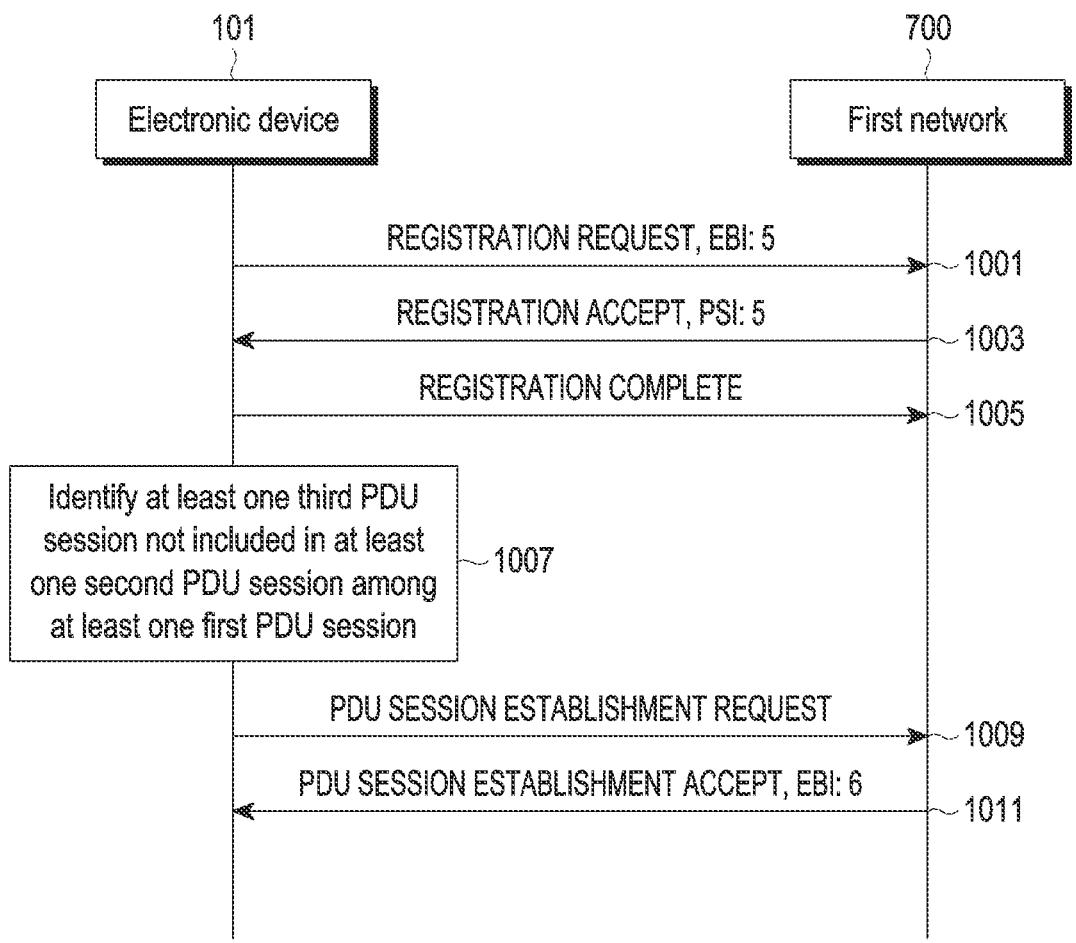
FIG. 10 is a flowchart illustrating an operating method of an electronic device according to an embodiment of the disclosure.

FIG. 10 is a flowchart illustrating an operating method of an electronic device according to an embodiment of the disclosure.

According to various embodiments, the electronic device 101 (e.g., at least one of the processor 120 of FIG. 1, FIG. 2A, or FIG. 2B, the first communication processor 212 of FIG. 2A, the second communication processor 214 of FIG. 2A, or the integrated communication processor 260 of FIG. 2B) may perform a handover procedure from an EPS to a 5GS as in FIG. 9. For example, as illustrated in FIG. 8B, it is assumed that the electronic device 101 establishes one PDN connection of EBI=5 in a state of being registered in the EPS. Referring to FIG. 10, in operation 1001, an electronic device 101 may transmit a registration request message including EBI=5 to a first network 700 corresponding to the 5GS. The first network 700 may establish a PDU session of PSI=5, based on the EBI (e.g., EBI=5) in the registration request message. In operation 1003, the first network 700 may transmit a registration accept message including information of PSI=5 to the electronic device 101. In operation 1005, the electronic device 101 may transmit a registration complete message to the first network 700. Accordingly, the PDU session of PSI=5 may be established between the electronic device 101 and the first network 700.

According to various embodiments, in operation 1007, the electronic device 101 may identify at least one third PDU session that is not included in at least one second PDU session among at least one first PDU session. For example, before an EPS fallback, the electronic device 101 stores information related to a PDU session of PSI=5 and a PDU session of PSI=6 in operation 795 of FIG. 7C. The electronic device 101 may identify that the PDU session of PSI=6 does not exist based on establishment of the PDU session of PSI=5 after returning to the 5GS. In operation 1009, the electronic device 101 may transmit a PDU session establishment request message for establishing the PDU session of PSI=6 to the first network 700. The first network 700 may transmit a PDU session establishment accept message for the PDU session of PSI=6 to the electronic device 101 in operation 1011. The PDU session establishment accept message may include information of PSI=6 and information of mapped EBI=6. The PDU session of PSI=5 and the PDU session of PSI=6 may be established between the electronic device 101 and the first network 700. Accordingly, the electronic device 101 may use the same PDU sessions before the EPS fallback and after returning to the 5GS and may thus continuously use a service.

Figure 11:
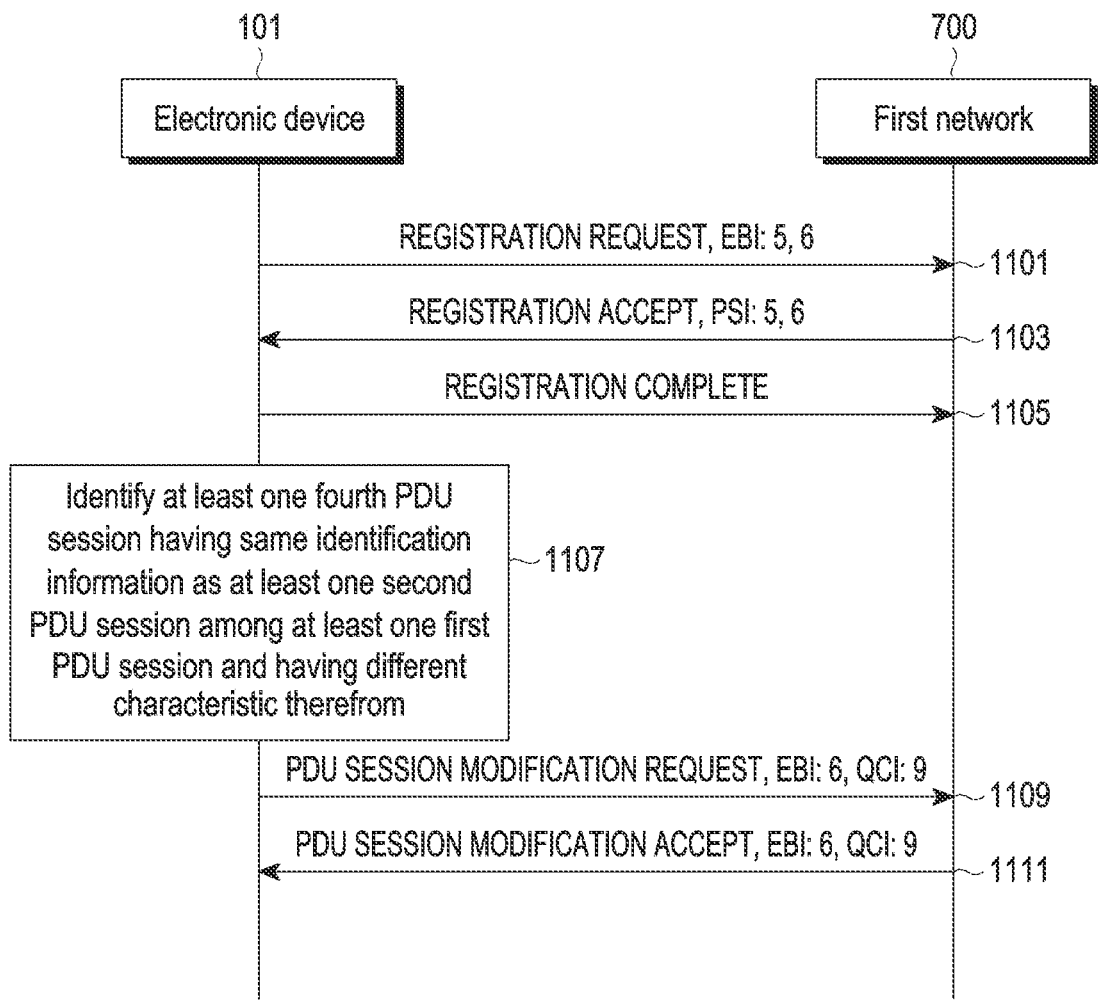
FIG. 11 is a flowchart illustrating an operating method of an electronic device according to an embodiment of the disclosure.

FIG. 11 is a flowchart illustrating an operating method of an electronic device according to an embodiment of the disclosure.

According to various embodiments, the electronic device 101 (e.g., at least one of the processor 120 of FIG. 1, FIG. 2A, or FIG. 2B, the first communication processor 212 of FIG. 2A, the second communication processor 214 of FIG. 2A, or the integrated communication processor 260 of FIG. 2B) may perform a handover procedure from an EPS to a 5GS as in FIG. 9. For example, it is assumed that the electronic device 101 establishes a PDN connection of EBI=5 and a PDN connection of EBI=6 in a state of being registered in the EPS. The PDN connection of EBI=5 may correspond to a PDU session of PSI=5 before an EPS fallback, and the PDN connection of EBI=6 may correspond to a PDU session of PSI=6 before the EPS fallback. Referring to FIG. 11, in operation 1101, an electronic device 101 may transmit a registration request message including EBI=5 and EBI=6 to a first network 700 corresponding to the 5GS. For example, when a tracking area code (TAC) and/or a cell identifier are the same as before, the electronic device 101 may transmit a registration request message including an EBI used in the EPS. The first network 700 may establish a PDU session of PSI=5 and a PDU session of PSI=6, based on the EBIs (e.g., EBI=5 and 6) in the registration request message. In operation 1103, the first network 700 may transmit a registration accept message including information of PSI=5 and 6 to the electronic device 101. In operation 1105, the electronic device 101 may transmit a registration complete message to the first network 700. Accordingly, the PDU session of PSI=5 and the PDU session of PSI=6 may be established between the electronic device 101 and the first network 700.

According to various embodiments, in operation 1107, the electronic device 101 may identify at least one fourth PDU session having the same identification information as at least one second PDU session among at least one first PDU session and having a different characteristic therefrom. For example, the electronic device 101 may identify that the QCI of the PDU session of PSI=6 before the EPS fallback, which is 9 does not match the QCI of the PDU session of PSI=6 after returning to the 5GS, which is 2. The electronic device 101 may determine to modify the characteristic of the PDU session, for example, the QCI, to be the same as that before the EPS fallback. In operation 1109, the electronic device 101 may transmit a PDU session modification request message for modifying the QCI of the PDU session of PSI=6 to 9 to the first network 700. The PDU session modification request message may include information of PSI=6 and information of QCI=9. The first network 700 may modify the QCI of the PDU session of PSI=6 to 9, for example, the QCI of a QoS flow in the PDU session to 9, based on the PDU session modification request message. In operation 1111, the first network 700 may transmit a PDU session modification accept message to the electronic device 101. The PDU session modification accept message may include the information of PSI=6 and the information of QCI=9. Accordingly, the electronic device 101 may use the PDU sessions of the same characteristic before the EPS fallback and after returning to the 5GS and may thus continuously use a service.

Figure 12:
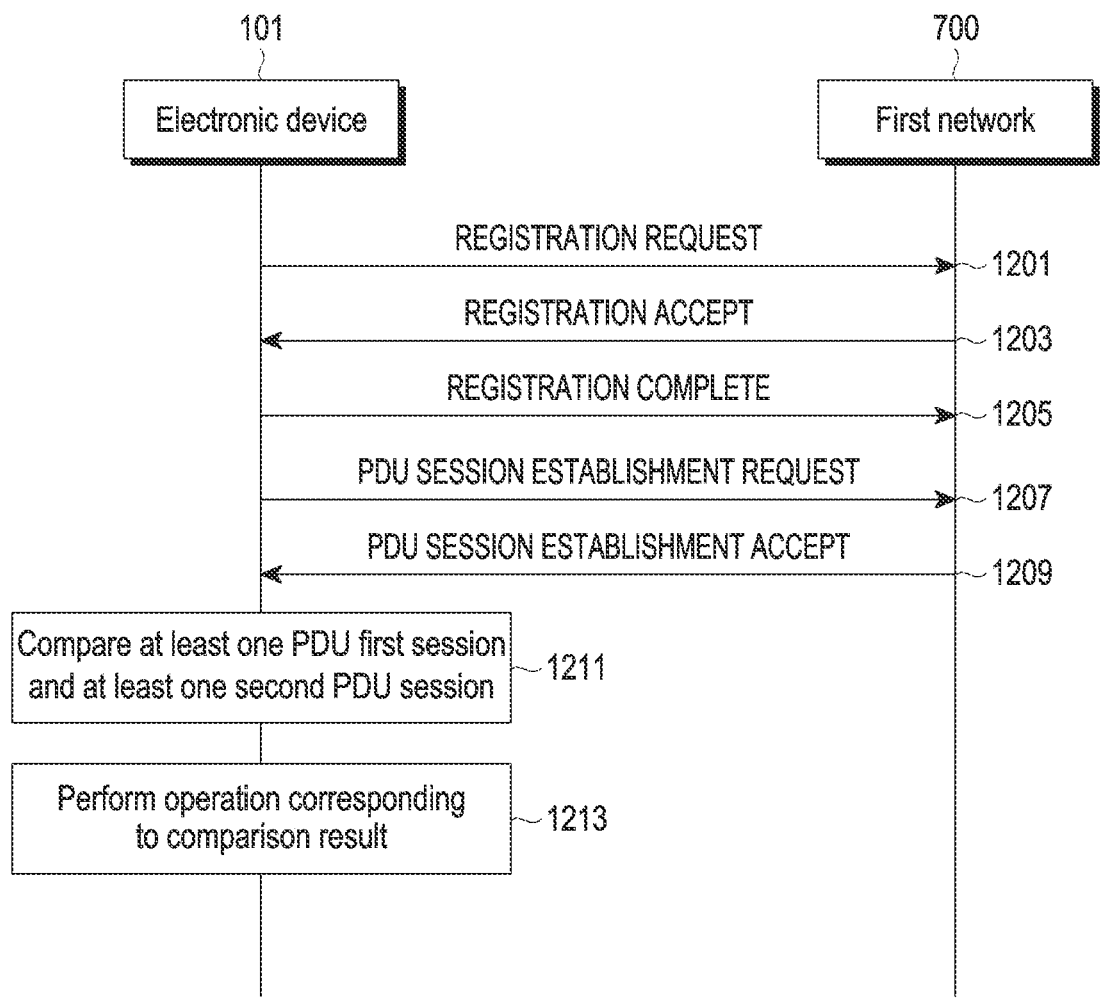
FIG. 12 is a flowchart illustrating an operating method of an electronic device according to an embodiment of the disclosure.

FIG. 12 is a flowchart illustrating an operating method of an electronic device according to an embodiment of the disclosure.

According to various embodiments, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may perform a handover procedure from an EPS to a 5GS. Referring to FIG. 12, when a first network 700 does not support an N26 interface, an electronic device 101 may transmit a registration request message not including an EBI to the first network 700 in operation 1201. For example, whether the N26 interface is supported may be identified based on a flag of an information element (IE) of a 5GS network feature support. In operation 1203, the electronic device 101 may receive a registration accept message from the first network 700. In operation 1205, the electronic device 101 may transmit a registration complete message to the first network 700. When the N26 interface is supported, the electronic device 101 may transmit a PDU session establishment request message to the first network 700 in operation 1207 after registering with the 5GS. For example, the electronic device 101 may transmit a message for establishing a PDU session corresponding to a PDN connection, which is established in a state of being registered in the EPS, to the first network 700. For example, the PDU session establishment request message may have a configuration of a handover type. In operation 1209, the electronic device 101 may receive a PDU session establishment accept message from the first network 700.

According to various embodiments, in operation 1211, the electronic device 101 may compare at least one first PDU session established before an EPS fallback and at least one PDU session established after returning to the 5GS. In operation 1213, the electronic device 101 may perform an operation corresponding to a comparison result. When a PDU session not included in at least one second PDU session established after returning to the 5GS among the at least one first PDU session established before the EPS fallback is identified, the electronic device 101 may transmit a PDU session establishment request message for establishing the identified session. When a PDU session having the same identification information as the at least one second PDU session established after returning to the 5GS and having a different characteristic therefrom among the at least one first PDU session established before the EPS fallback, is identified, the electronic device 101 may transmit a PDU session modification request message for modifying the characteristic of the identified PDU session.

According to various embodiments, an electronic device (e.g., the electronic device 101) may include at least one processor (e.g., at least one of the processor 120, the first communication processor 212, the second communication processor 214, or the integrated communication processor 260), wherein the at least one processor may be configured to establish at least one first PDU session in a state of being registered in a 5GS, store first information related to the at least one first PDU session, perform a procedure for registering with an EPS, based on at least one first trigger causing a system fallback from the 5GS to the EPS, perform a procedure for registering with the 5GS, based on at least one second trigger causing a return to the 5GS, compare second information related to at least one second PDU session, established in association with registration with the 5GS, with the first information, perform an operation of establishing, based on a result of comparing the first information and the second information, at least one third PDU session when the at least one third PDU session not included in the at least one second PDU session among the at least one first PDU session is identified, and perform an operation of modifying, based on the result of comparing the first information and the second information, at least one fourth PDU session when the at least one fourth PDU session having a same identification information as the at least one second PDU session and having a characteristic different from a characteristic of the at least one second PDU session among the at least one first PDU session is identified.

According to various embodiments, the at least one processor may be, as at least part of the performing of the procedure for registering with the EPS, configured to perform a tracking area update (TAU) procedure or an attach procedure with a network corresponding to the EPS.

According to various embodiments, the at least one processor may be, as at least part the performing of the TAU procedure or the attach procedure, configured to transmit a TAU request message according to the TAU procedure or an attach request message according to the attach procedure, which includes identification information corresponding to the at least one first PDU session, and receive a TAU accept message according to the TAU procedure or an attach accept message according to the attach procedure, which includes identification information about at least one PDN connection corresponding to portion of the at least one first PDU session, wherein the electronic device, in a state of being registered in the EPS, may establish the at least one PDN connection with the network corresponding to the EPS and may not establish a PDN connection corresponding to a remaining PDU session other than the portion of the at least one first PDU session.

According to various embodiments, the at least one processor may be, as at least part of the performing of the procedure for registering with the 5GS, based on the at least one second trigger causing the return to the 5GS, configured to transmit a registration request message including identification information about the at least one PDU session to a network corresponding to the 5GS, and receive a registration accept message corresponding to the registration request message from the network corresponding to the 5GS, and wherein the registration accept message may include identification information corresponding to the at least one second PDU session.

According to various embodiments, the at least one third PDU session may correspond to the remaining PDU session other than the portion of the at least one first PDU session, and wherein the at least one processor may be, as at least part of the establishing of the at least one third PDU session, configured to transmit a PDU session establishment request message including information stored in association with the remaining PDU session other than the portion of the at least one first PDU session to the network corresponding to the 5GS.

According to various embodiments, the at least one processor may be, as at least part of the performing of the TAU procedure or the attach procedure, configured to transmit a TAU request message according to the TAU procedure or an attach request message according to the attach procedure, which includes identification information corresponding to the at least one first PDU session, and receive a TAU accept message according to the TAU procedure or an attach accept message according to the attach procedure, which includes identification information about at least one PDN connection corresponding to the at least one first PDU session, wherein the electronic device, in a state of being registered in the EPS, may establish the at least one PDN connection with the network corresponding to the EPS.

According to various embodiments, the at least one processor may be, as at least part of the performing of the procedure for registering with the 5GS, based on the at least one second trigger causing the return to the 5GS, configured to transmit a registration request message including identification information about the at least one PDU session to a network corresponding to the 5GS, and receive a registration accept message corresponding to the registration request message from the network corresponding to the 5GS, wherein the registration accept message may include identification information corresponding to the at least one second PDU session, wherein the at least one fourth PDU session among the at least one first PDU session may have the same identification information as at least portion of the at least one second PDU session and may have a different characteristic therefrom.

According to various embodiments, the at least one processor may be, as at least part of the modifying of the at least one fourth PDU session, configured to transmit, to the network corresponding to the 5GS, a PDU session modification request message including identification information corresponding to the at least one fourth PDU session and characteristic of the at least one fourth PDU session.

According to various embodiments, the at least one processor may be, as at least part the performing of the procedure for registering with the 5GS, configured to transmit, to a network corresponding to the 5GS when the network corresponding to the 5GS supports an N26 interface, a registration request message including identification information about at least one PDN connection established between the electronic device and a network corresponding to the EPS in a state of being registered in the EPS.

According to various embodiments, the at least one processor may be further configured to transmit, to a network corresponding to the 5GS, based on the network corresponding to the 5GS does not supporting an N26 interface, a PDU session establishment request message including identification information about at least one PDN connection established between the electronic device and a network corresponding to the EPS in a state of being registered in the EPS, in the state of being registered in the 5GS.

According to various embodiments, an operating method of an electronic device (e.g., the electronic device 101) may include establishing at least one first PDU session in a state of being registered in a 5GS, storing first information related to the at least one first PDU session, performing a procedure for registering with an EPS, based on at least one first trigger causing a system fallback from the 5GS to the EPS, performing a procedure for registering with the 5GS, based on at least one second trigger causing a return to the 5GS, comparing second information related to at least one second PDU session, established in association with registration with the 5GS, with the first information, performing an operation of establishing, based on a result of comparing the first information with the second information, at least one third PDU session when the at least one third PDU session not included in the at least one second PDU session among the at least one first PDU session is identified, and performing an operation of modifying, based on the result of comparing the first information with the second information, at least one fourth PDU session when the at least one fourth PDU session having a same identification information as the at least one second PDU session and having a characteristic different from a characteristic of the at least one second PDU session among the at least one first PDU session is identified.

According to various embodiments, the performing of the procedure for registering with the EPS performs a tracking area update (TAU) procedure or an attach procedure with a network corresponding to the EPS.

According to various embodiments, the performing of the TAU procedure or the attach procedure may include transmitting a TAU request message according to the TAU procedure or an attach request message according to the attach procedure, which includes identification information corresponding to the at least one first PDU session, and receiving a TAU accept message according to the TAU procedure or an attach accept message according to the attach procedure, which includes identification information about at least one PDN connection corresponding to portion of the at least one first PDU session, and wherein the electronic device, in a state of being registered in the EPS, may establish the at least one PDN connection with the network corresponding to the EPS and may not establish a PDN connection corresponding to a remaining PDU session other than the portion of the at least one first PDU session.

According to various embodiments, the performing of the procedure for registering with the 5GS, based on the at least one second trigger causing the return to the 5GS may include transmitting a registration request message including identification information about the at least one PDU session to a network corresponding to the 5GS, and receiving a registration accept message corresponding to the registration request message from the network corresponding to the 5GS, wherein the registration accept message may include identification information corresponding to the at least one second PDU session.

According to various embodiments, the at least one third PDU session may correspond to the remaining PDU session other than the portion of the at least one first PDU session, wherein the performing of the operation of establishing the at least one third PDU session may include transmitting a PDU session establishment request message including information stored in association with the remaining PDU session other than the portion of the at least one first PDU session to the network corresponding to the 5GS.

According to various embodiments, the performing of the TAU procedure or the attach procedure may include transmitting a TAU request message according to the TAU procedure or an attach request message according to the attach procedure, which includes identification information corresponding to the at least one first PDU session, and receiving a TAU accept message according to the TAU procedure or an attach accept message according to the attach procedure, which includes identification information about at least one PDN connection corresponding to the at least one first PDU session, wherein the electronic device, in a state of being registered in the EPS, may establish the at least one PDN connection with the network corresponding to the EPS.

According to various embodiments, the performing of the procedure for registering with the 5GS, based on the at least one second trigger causing the return to the 5GS may include transmitting a registration request message including identification information about the at least one PDU session to a network corresponding to the 5GS, and receiving a registration accept message corresponding to the registration request message from the network corresponding to the 5GS, wherein the registration accept message may include identification information corresponding to the at least one second PDU session, wherein the at least one fourth PDU session among the at least one first PDU session may have the same identification information as at least portion of the at least one second PDU session and may have a different characteristic therefrom.

According to various embodiments, the performing of the operation of modifying the at least one fourth PDU session transmits, to the network corresponding to the 5GS, a PDU session modification request message including the identification information corresponding to the at least one fourth PDU session and the characteristic of the at least one fourth PDU session.

According to various embodiments, the performing of the procedure for registering with the 5GS transmits, to a network corresponding to the 5GS, based on the network corresponding to the 5GS supporting an N26 interface, a registration request message including identification information about at least one PDN connection established between the electronic device and a network corresponding to the EPS in a state of being registered in the EPS.

According to various embodiments, the method may further include transmitting, to a network corresponding to the 5GS, based on the network corresponding to the 5GS does not supporting an N26 interface, a PDU session establishment request message including identification information about at least one PDN connection established between the electronic device and a network corresponding to the EPS in a state of being registered in the EPS in the state of being registered in the 5GS.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   memory storing one or more computer programs; and
   one or more processors communicatively coupled to the memory,
   wherein the one or more computer programs include computer-executable instructions that, when executed by the one or more processors, cause the electronic device to:
   establish at least one first protocol data unit (PDU) session in a state of being registered in a $5^{th}$ generation system (5GS),
   store first information related to the at least one first PDU session, wherein the first information includes at least one of network information of the at least one first PDU session, first PDU session information including first PDU session ID (PSI) of the at least one first PDU session, or first QoS information of at least one first PDU session,
   perform a procedure for registering with an evolved packet system (EPS), based on at least one first trigger causing a system fallback from the 5GS to the EPS,
   perform a procedure for registering with the 5GS, based on at least one second trigger causing a return to the 5GS,
   compare second information, related to a second PDU session, established in association with registration with the 5GS, with the first information, wherein the second information includes at least one of network information on the second PDU session, second PDU session information including second PSI of the second PDU session, or second QoS information of the second PDU session,
   when the first PSI is different from the second PSI, establish at least one third PDU session based on the first information, and
   when 1) the first PSI corresponds to the second PSI and 2) a characteristic of the at least one first PDU session and a characteristic of the second PDU session are different from each other, modify the second PDU session based on the first information,
   wherein the characteristic of the at least one first PDU session includes at least one of single network slice selection assistance information (S-NSSAI) of the at least one first PDU session, QoS class identifier (QCI) of the at least one first PDU session, or data network name (DNN) of the at least one first PDU session, and
   wherein the characteristic of the second PDU session includes at least one of S-NSSAI of the second PDU session, QCI of the second PDU session, or data network name (DNN) of the second PDU session.

2. The electronic device of claim 1, wherein the one or more computer programs further include computer-executable instructions that, when executed by the one or more processors, cause the electronic device to perform a tracking area update (TAU) procedure or an attach procedure with a network corresponding to the EPS.

3. The electronic device of claim 2,
   wherein the one or more computer programs further include computer-executable instructions that, when executed by the one or more processors, cause the electronic device to:
   transmit a TAU request message according to the TAU procedure or an attach request message according to the attach procedure, which includes identification information corresponding to the at least one first PDU session, and
   receive a TAU accept message according to the TAU procedure or an attach accept message according to the attach procedure, which includes identification information about at least one packet data network (PDN) connection corresponding to a portion of the at least one first PDU session, and
   wherein the electronic device, in a state of being registered in the EPS, establishes the at least one PDN connection with the network corresponding to the EPS and does not establish a PDN connection corresponding to a remaining PDU session other than the portion of the at least one first PDU session.

4. The electronic device of claim 3,
   wherein the one or more computer programs further include computer-executable instructions that, when executed by the one or more processors, cause the electronic device to:
   transmit a registration request message comprising identification information about the at least one first PDU session to a network corresponding to the 5GS, and
   receive a registration accept message corresponding to the registration request message from the network corresponding to the 5GS, and
   wherein the registration accept message includes identification information corresponding to the second PDU session.

5. The electronic device of claim 4,
   wherein the at least one third PDU session corresponds to the remaining PDU session other than the portion of the at least one first PDU session, and
   wherein the one or more computer programs further include computer-executable instructions that, when executed by the one or more processors, cause the electronic device to transmit a PDU session establishment request message comprising information stored in association with the remaining PDU session other than the portion of the at least one first PDU session to the network corresponding to the 5GS.

6. The electronic device of claim 2,
   wherein the one or more computer programs further include computer-executable instructions that, when executed by the one or more processors, cause the electronic device to:

transmit a TAU request message according to the TAU procedure or an attach request message according to the attach procedure, which includes identification information corresponding to the at least one first PDU session, and receive a TAU accept message according to the TAU procedure or an attach accept message according to the attach procedure, which includes identification information about at least one PDN connection corresponding to the at least one first PDU session, and wherein the electronic device, in a state of being registered in the EPS, establishes the at least one PDN connection with the network corresponding to the EPS.

7. The electronic device of claim 6,
wherein the one or more computer programs further include computer-executable instructions that, when executed by the one or more processors, cause the electronic device to:
transmit a registration request message comprising identification information about the at least one PDU session to a network corresponding to the 5GS, and
receive a registration accept message corresponding to the registration request message from the network corresponding to the 5GS,
wherein the registration accept message includes identification information corresponding to the at least one second PDU session, and
wherein the modified second PDU session has the same identification information as at least portion of the second PDU session and has a characteristic different from the characteristic of the second PDU session among the at least one first PDU session.

8. The electronic device of claim 7, wherein the one or more computer programs further include computer-executable instructions that, when executed by the one or more processors, cause the electronic device to transmit, to the network corresponding to the 5GS, a PDU session modification request message comprising identification information corresponding to the modified second PDU session and characteristic of the modified second PDU session.

9. The electronic device of claim 1, wherein the one or more computer programs further include computer-executable instructions that, when executed by the one or more processors, cause the electronic device to:
transmit, to a network corresponding to the 5GS, based on the network corresponding to the 5GS supporting an N26 interface, a registration request message comprising identification information about at least one PDN connection established between the electronic device and a network corresponding to the EPS, in a state of being registered in the EPS.

10. The electronic device of claim 1, wherein the one or more computer programs further include computer-executable instructions that, when executed by the one or more processors, cause the electronic device to:
transmit, to a network corresponding to the 5GS, based on the network corresponding to the 5GS does not supporting an N26 interface, a PDU session establishment request message comprising identification information about at least one PDN connection established between the electronic device and a network corresponding to the EPS, in a state of being registered in the EPS, in the state of being registered in the 5GS.

11. A non-transitory storage medium storing one or more program, the one or more program comprising computer-executable instructions, when executed by at least one processor an electronic device, cause the electronic device to:
establish at least one first protocol data unit (PDU) session in a state of being registered in a $5^{th}$ generation system (5GS);
store first information related to the at least one first PDU session, wherein the first information includes at least one of network information of the at least one first PDU session, first PDU session information including first PDU session ID (PSI) of the at least one first PDU session, or first QoS information of at least one first PDU session;
perform a procedure for registering with an evolved packet system (EPS), based on at least one first trigger causing a system fallback from the 5GS to the EPS;
perform a procedure for registering with the 5GS, based on at least one second trigger causing a return to the 5GS;
compare second information related to a second PDU session, established in association with registration with the 5GS, with the first information, wherein the second information includes at least one of network information on the second PDU session, second PDU session information including second PSI of the second PDU session, or second QoS information of the second PDU session;
when the first PSI is different from the second PSI, establish at least one third PDU session based on the first information; and
when 1) the first PSI corresponds to the second PSI and 2) a characteristic of the at least one first PDU session and a characteristic of the second PDU session are different from each other, modify the second PDU session based on the first information,
wherein the characteristic of the at least one first PDU session includes at least one of S-NSSAI of the at least one first PDU session, QCI of the at least one first PDU session, or data network name (DNN) of the at least one first PDU session, and
wherein the characteristic of the second PDU session includes at least one of S-NSSAI of the second PDU session, QCI of the second PDU session, or data network name (DNN) of the second PDU session.

12. The non-transitory storage medium of claim 11, wherein the performing of the procedure for registering with the EPS performs a tracking area update (TAU) procedure or an attach procedure with a network corresponding to the EPS.

13. The non-transitory storage medium of claim 12,
wherein the performing of the TAU procedure or the attach procedure comprises:
transmitting a TAU request message according to the TAU procedure or an attach request message according to the attach procedure, which includes identification information corresponding to the at least one first PDU session, and
receiving a TAU accept message according to the TAU procedure or an attach accept message according to the attach procedure, which includes identification information about at least one PDN connection corresponding to a portion of the at least one first PDU session, and
wherein the electronic device, in a state of being registered in the EPS, establishes the at least one PDN connection with the network corresponding to the EPS and does not establish a PDN connection corresponding to a remaining PDU session other than the portion of the at least one first PDU session.

14. The non-transitory storage medium of claim 13, wherein the performing of the procedure for registering with the 5GS, based on the at least one second trigger causing the return to the 5GS comprises:
transmitting a registration request message comprising identification information about the at least one first PDU session to a network corresponding to the 5GS, and
receiving a registration accept message corresponding to the registration request message from the network corresponding to the 5GS, and
wherein the registration accept message includes identification information corresponding to the at least one second PDU session.

15. The non-transitory storage medium of claim 14, wherein the at least one third PDU session corresponds to the remaining PDU session other than the portion of the at least one first PDU session, and
wherein the performing of the operation of establishing the at least one third PDU session includes transmitting a PDU session establishment request message comprising information stored in association with the remaining PDU session other than the portion of the at least one first PDU session to the network corresponding to the 5GS.

16. The non-transitory storage medium of claim 12, wherein the performing of the TAU procedure or the attach procedure comprises:
transmitting a TAU request message according to the TAU procedure or an attach request message according to the attach procedure, which includes identification information corresponding to the at least one first PDU session, and
receiving a TAU accept message according to the TAU procedure or an attach accept message according to the attach procedure, which includes identification information about at least one PDN connection corresponding to the at least one first PDU session, and
wherein the electronic device, in a state of being registered in the EPS, establishes the at least one PDN connection with the network corresponding to the EPS.

17. The non-transitory storage medium of claim 16, wherein the performing of the procedure for registering with the 5GS, based on the at least one second trigger causing the return to the 5GS comprises:
transmitting a registration request message comprising identification information about the at least one PDU session to a network corresponding to the 5GS, and
receiving a registration accept message corresponding to the registration request message from the network corresponding to the 5GS,
wherein the registration accept message includes identification information corresponding to the at least one second PDU session, and
wherein the modified second PDU session has the same identification information as at least portion of the at least one second PDU session and has a characteristic different from the characteristic of the at least one second PDU session among the at least one first PDU session.

18. The non-transitory storage medium of claim 17, wherein the performing of the operation of modifying the modified second PDU session transmits, to the network corresponding to the 5GS, a PDU session modification request message comprising the identification information corresponding to the modified second PDU session and the characteristic of the modified second PDU session.

19. The non-transitory storage medium of claim 11, wherein the performing of the procedure for registering with the 5GS transmits, to a network corresponding to the 5GS, based on the network corresponding to the 5GS supporting an N26 interface, a registration request message comprising identification information about at least one PDN connection established between the electronic device and a network corresponding to the EPS in a state of being registered in the EPS.

20. The non-transitory storage medium of claim 11, further comprising:
transmitting, to a network corresponding to the 5GS, based on the network corresponding to the 5GS does not supporting an N26 interface, a PDU session establishment request message comprising identification information about at least one PDN connection established between the electronic device and a network corresponding to the EPS in a state of being registered in the EPS, in the state of being registered in the 5GS.

* * * * *